United States Patent
Wang et al.

(10) Patent No.: US 9,430,715 B1
(45) Date of Patent: Aug. 30, 2016

(54) IDENTIFYING AND MODIFYING CAST SHADOWS IN AN IMAGE

(71) Applicant: Adobe Systems Incorporated, San Jose, CA (US)

(72) Inventors: Jue Wang, Kenmore, WA (US); Kalyan Sunkavalli, San Jose, CA (US); Li-Qian Ma, Beijing (CN); Elya Shechtman, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/702,588

(22) Filed: May 1, 2015

(51) Int. Cl.
| | |
|---|---|
| *G06K 9/34* | (2006.01) |
| *G06K 9/46* | (2006.01) |
| *G06T 5/00* | (2006.01) |
| *G06K 9/42* | (2006.01) |
| *G06T 7/00* | (2006.01) |
| *G06K 9/40* | (2006.01) |
| *G06K 9/44* | (2006.01) |
| *G06K 9/62* | (2006.01) |
| *G06K 9/66* | (2006.01) |

(52) U.S. Cl.
CPC ............. *G06K 9/4661* (2013.01); *G06K 9/40* (2013.01); *G06K 9/42* (2013.01); *G06K 9/44* (2013.01); *G06K 9/4638* (2013.01); *G06K 9/6218* (2013.01); *G06K 9/66* (2013.01); *G06T 5/001* (2013.01); *G06T 7/0081* (2013.01)

(58) Field of Classification Search
USPC ....... 382/164, 274, 154, 100, 110, 113, 291; 1/1; 209/580; 345/426, 515; 348/89
See application file for complete search history.

(56) References Cited

U.S. PATENT DOCUMENTS 8,965,106 B1 * 2/2015 Farid .................... G06T 7/0002
382/154

OTHER PUBLICATIONS

Baba, M., Mukunoki, M., and Asada, N. 2004. Shadow removal from a real image based on shadow density. In ACM SIGGRAPH 2004 Posters.
Barnes, C., Shechtman, E., Finkelstein, A., and Gold Man, D. B. 2009. Patchmatch: a randomized correspondence algorithm for structural image editing. ACM Trans. Graph. 28, 3, 24:1-24:11.
Barnes, C., Shechtman, E., Goldman, D. B., and Finkel Stein, A. 2010. The generalized patchmatch correspondence algorithm. In Proc. of ECCV, 29-43.
Barrow, H. G., and Tenenbaum, J. M. 1978. Recovering intrinsic scene characteristics from images. In International Conference on Computer Vision Systems.

(Continued)

*Primary Examiner* — Anh Do
(74) *Attorney, Agent, or Firm* — Keller Jolley Preece

(57) ABSTRACT

Methods and systems for detection and removal of cast shadows from an image. In particular, one or more embodiments compute correspondences between image patches in the image using a grid-based patch-matching algorithm. One or more embodiments then train a regression model to detect shadows from the computed patch correspondences. One or more embodiments then segment the detected shadows into shadow regions and identify cast shadows from the shadow regions. Once the cast shadows are identified, one or more embodiments use patch-based synthesis of pixels guided by a direct inversion of the image. Optionally, one or more methods can use pixels from the synthesized image and the naïve inversion of the image, based on a synthesis confidence of each pixel, to produce a combined result.

20 Claims, 13 Drawing Sheets

(56) References Cited

OTHER PUBLICATIONS

Bonneel, N., Sunkavalli, K., Tompkin, J., Sun, D., Paris, S., and Pfister, H. 2014. Interactive intrinsic video editing. ACM Trans. Graph. 33, 6.

Comaniciu, D., and Meer, P. 2002. Mean shift: A robust approach toward feature space analysis. IEEE Trans. PAMI 24, 5, 603-619.

Cucchiara, R., Grana, C., Piccardi, M., Prati, A., and Sirotti, S. 2001. Improving shadow suppression in moving object detection with hsv color information. In Intelligent Transportation Systems, IEEE, 334-339.

Darabi, S. Shechtman, E., Barnes, C., Goldman, D. B., and Sen, P. 2012. Image Melding: Combining inconsistent images mages using patch-based synthesis. ACM Trans. Graph. 31, 4, 82:1-82:10.

Ecins, A., Fermäijller, C., and Aloimonos, Y. 2014. Shadow free segmentation in still images using local density measure. IEEE Computer Society.

Finlayson, G. D., Hordley, S. D., Lu, C., and Drew, M. S. 2002. Removing shadows from images. In Proc. of ECCV, 823-836.

Finlayson, G., Drew, M., and Lu, C. 2004. Intrinsic images by entropy minimization. In Proc. of ECCV, vol. 3023, 582-595.

Finlayson, G., Hordley, S., Lu, C., and Drew, M. 2006. On the removal of shadows from images. IEEE Trans. PAMI 28, 1, 59-68.

Fredembach, C., and Finlayson, G. D. 2005. Hamiltonian path-based shadow removal. In Proc. of the 16th British Machine Vision Conference, 502-511.

Geusebroek, J.-M., Van Den Boomgaard, R., Smeulders, A., and Geerts, H. 2001. Color invariance. IEEE Trans. PAMI 23, 12, 1338-1350.

Gong, H., Cosker, D., Li, C., and Brown, M. 2013. User-aided single image shadow removal. In Proc. of ICME, 1-6.

Grosse, R., Johnson, M. K., Adelson, E. H., and Freeman, W. T. 2009. Ground-truth dataset and baseline evaluations for intrinsic image algorithms. In Proc. of ICCV, 2335-2342.

Guo, R., Dai, Q., and Hoiem, D. 2011. Single-image shadow detection and removal using paired regions. Proc. of CVPR, 2033-2040.

Hacohen, Y., Shechtman, E., Goldman, D. B., and Lischinski, D. 2011. Non-rigid dense correspondence with applications for image enhancement. ACM Trans. Graph. 30, 4, 70:1-70:10.

He, K., Sun, J., and Tang, X. 2013. Guided image filtering. IEEE Trans. PAMI 35, 6, 1397-1409.

Hertzmann, A., Jacobs, C. E., Oliver, N., Curless, B., and Salesin, D. H. 2001. Image analogies. In Proc. SIG-GRAPH, 327-340.

Hu, S.-M., Zhang, F.-L., Wang, M., Martin, R. R., and Wang, J. 2013. Patchnet: A patch-based image representation for interactive library-driven image editing. ACM Trans. Graph. 32, 6, 196:1-196:12.

Liu, F., and Gleicher, M. 2008. Texture-consistent shadow removal. In Proc. of ECCV, 437-450.

Miyazaki, D., Matsushita, Y., and Ikeuchi, K. 2010. Interactive shadow removal from a single image using hierarchical graph cut. In Proc. of ACCV, vol. 5994. 234-245.

Mohan, A., Tumblin, J., and Choudhury, P. 2007. Editing soft shadows in a digital photograph. IEEE Computer Graphics and Applications 27, 2, 23-31.

Reynolds, M., Peel, L., Weyrich, T., and Brostow, G. J. 2011. Capturing time-of-flight data with confidence. In Proc. of CVPR, 1377.

Salvador, E., Cavallaro, A., and Ebrahimi, T. 2001. Shadow identification and classification using invariant color models. In Acoustics, Speech, and Signal Processing, IEEE International Conference on, vol. 3, 1545-1548 vol. 3.

Sanin, A., Sanderson, C., and Lovell, B. C. 2012. Shadow detection: A survey and comparative evaluation of recent methods. Pattern Recogn. 45, 4, 1684-1695.

Shechtman, E., Rav-Acha, A., Irani, M., and Seitz, S. 2010. Regenerative morphing. In Proc. of CVPR.

Shor, Y., and Lischinski, D. 2008. The shadow meets the mask: Pyramid-based shadow removal. Computer Graphics Forum 27, 2, 577-586.

Shotton, J., Girshick, R., Fitzgibbon, A., Sharp, T., Cook, M., Finocchio, M., Moore, R., Kohli, P., Criminisi, A., Kipman, A., and Blake, A. 2012. Efficient human pose estimation from single depth images. IEEE Trans. PAMI.

Simakov, D. Caspi, Y., Shechtman, E., and Irani, M. 2008. Summarizing visual data using bidirectional similarity. In Proc. of CVPR.

Wexler, Y., Shechtman, E., and Irani, M. 2007. Space time completion of video. IEEE Trans. PAMI 29, 3, 463-476.

Wu, T.-P., and Tang, C.-K. 2005. A bayesian approach for shadow extraction from a single image. In Tenth IEEE International Conference on Computer Vision, vol. 1, 480-487.

Wu, T.-P., Tang, C.-K., Brown, M. S., and Shum, H.-Y. 2007. Natural shadow matting. ACM Trans. Graph. 26, 2.

Xu, L., Qi, F., Jiang, R., Hao, Y., Wu, G., Xu, L., Qi, F., Jiang, R., Hao, Y., and Wu, G., 2006. Shadow detection and removal in real images: A survey.

\* cited by examiner

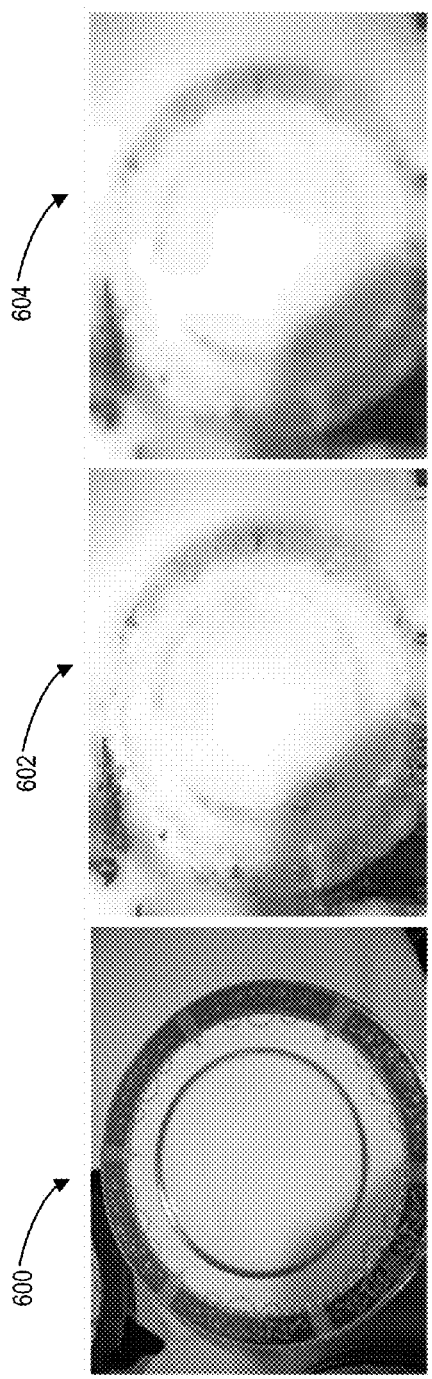
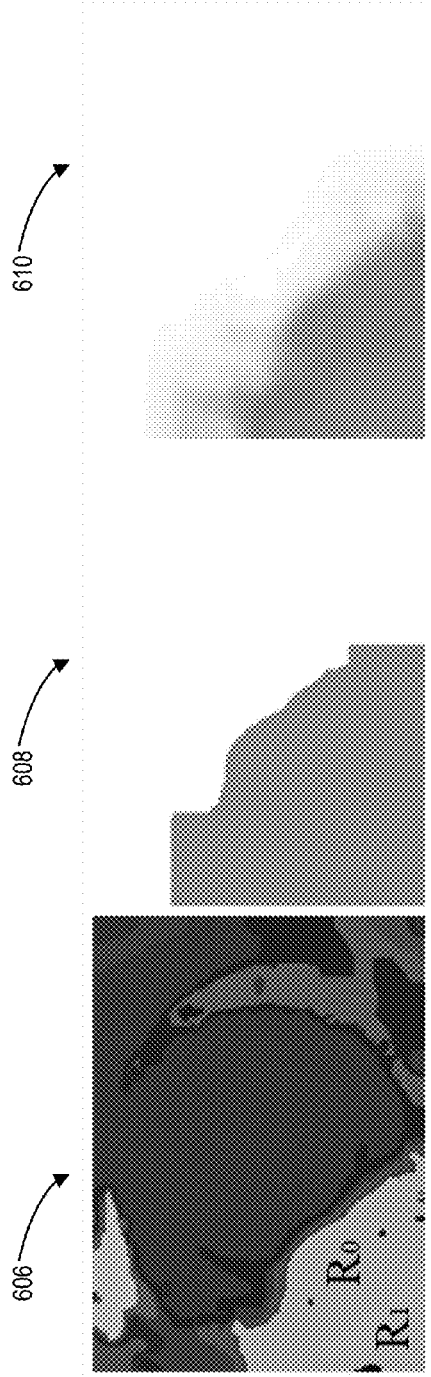

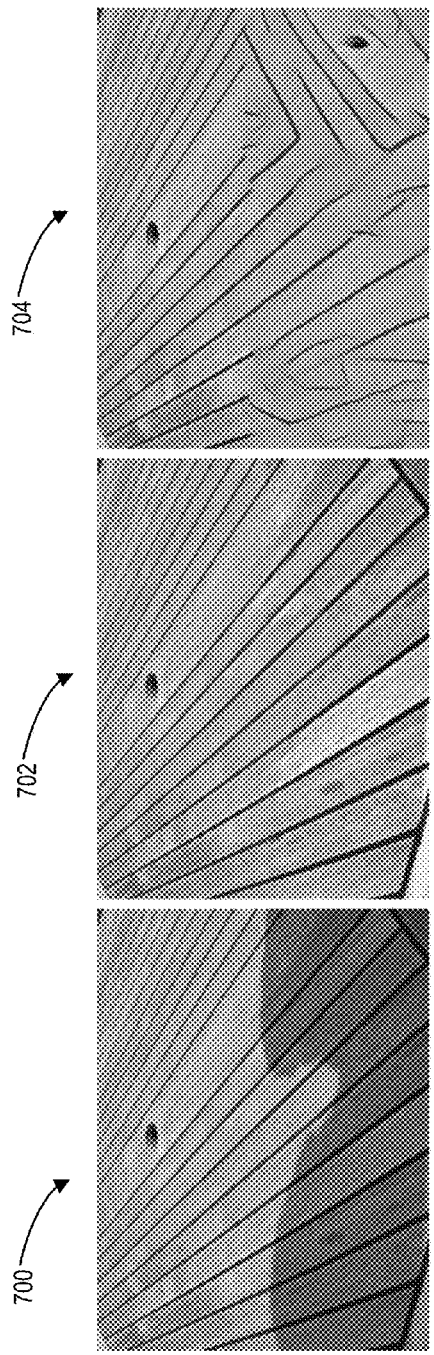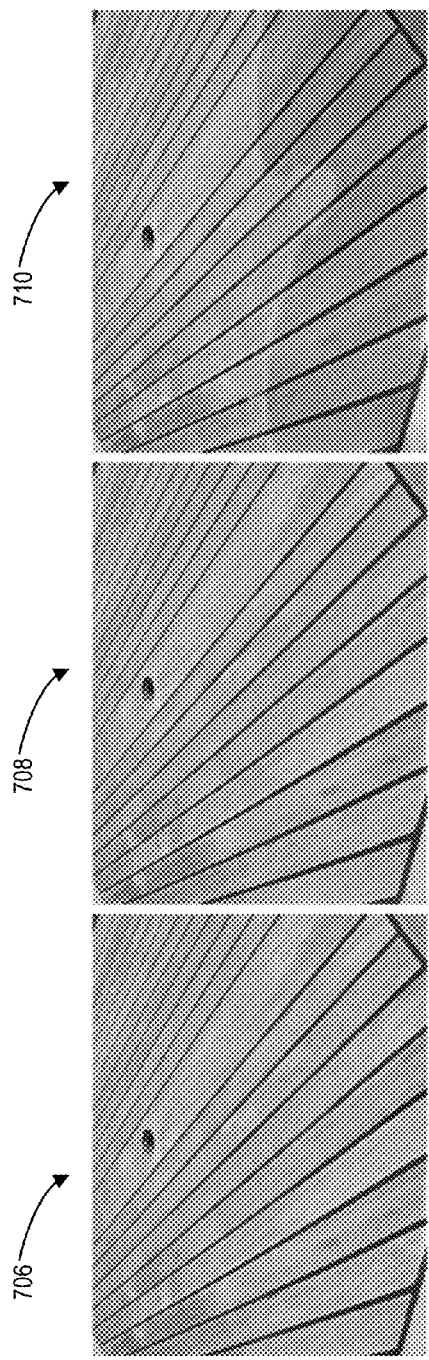

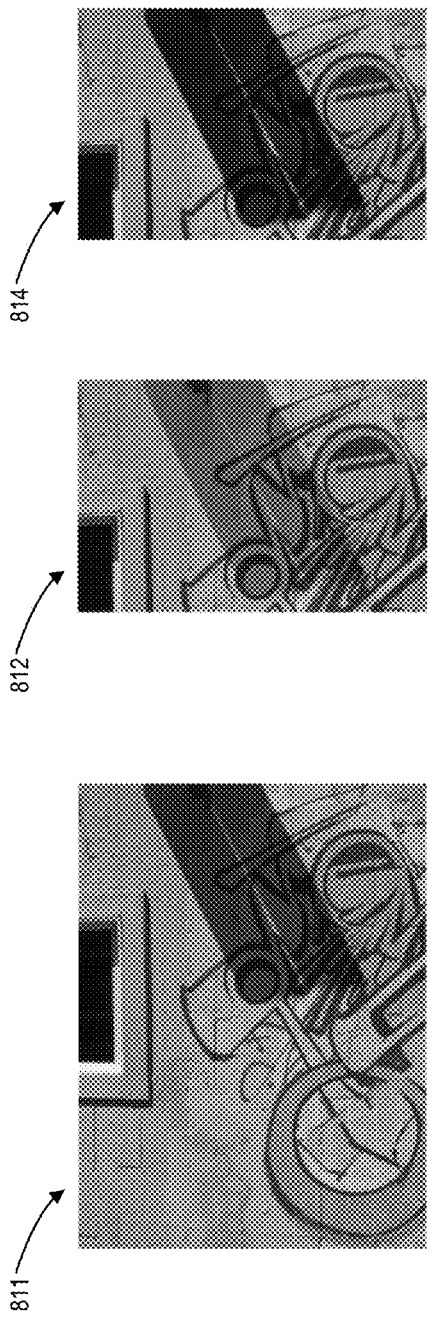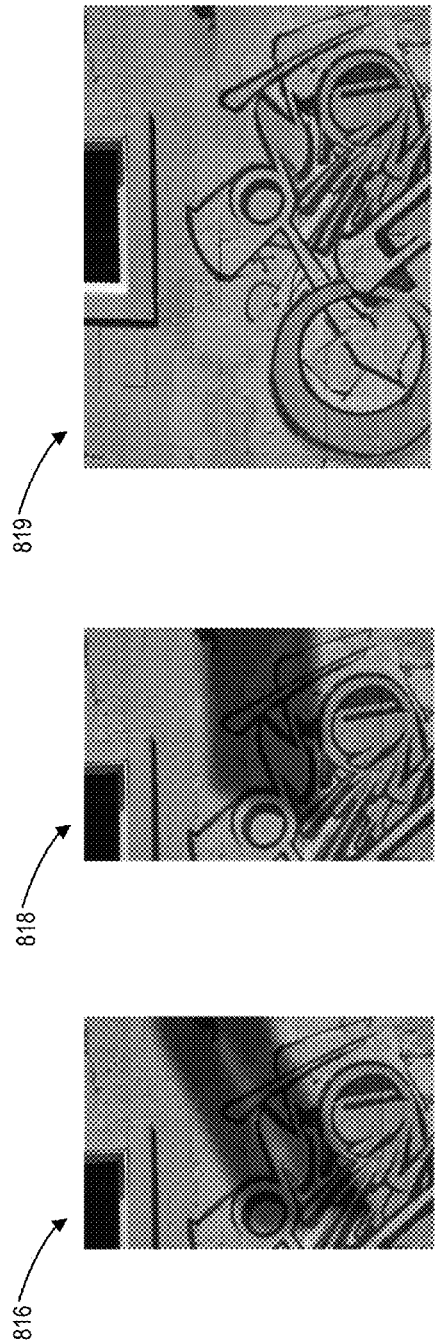
Fig. 8G, Fig. 8H, Fig. 8I, Fig. 8J, Fig. 8K, Fig. 8L

IDENTIFYING AND MODIFYING CAST SHADOWS IN AN IMAGE

BACKGROUND

1. Technical Field

One or more embodiments relate generally to systems and methods for detecting and modifying shadows in an image. More specifically, one or more embodiments relate to systems and methods of patch-based detection and removal of cast shadows in a digital image.

2. Background and Relevant Art

Photographs often include cast shadows created by objects outside the frame of the images. For example, a cast shadow can be a product of a shadow of the person taking an image when a light source is behind the person taking the image. Cast shadows can create unwanted artifacts and/or color or luminance differences within the image that can hide or alter an appearance of objects within the frame of the image, detracting from the visual appeal of the image. In particular, the period of time just after sunrise or just before sunset provides soft, diffuse lighting that is often desirable for taking photographs, but the low altitude of the sun can produce long shadows that interfere with the image.

Image processing techniques that allow for the removal or other modification of cast shadows from an image can be useful in generating an image that simulates what the image would look like without the shadow. Unfortunately, conventional image processing systems that allow for the removal of shadows have several drawbacks. For instance, conventional image-processing systems often have difficulty in identifying cast shadows. In particular, the variations in texture and other properties of different materials visible within an image can make it difficult to accurately predict where shadows are in an image. In addition, conventional image-processing systems often have difficulty to distinguishing between shadows cast by objects that are within the image and shadows cast by objects that are outside the image. Due to the ambiguous nature of shadow detection, many conventional image-processing systems rely on manual input to initially identify shadows in an image. Manually identifying the shadows can be tedious, as well as imprecise or variable based on the perception of the user providing the input.

Some conventional image-processing systems are proficient at detecting shadows with hard edges using illuminant invariant features of an image (e.g., hue channel in the HSV color space). Because shadow boundaries do not exist in such illuminant invariant features, conventional image-processing systems can detect shadows with hard edges. Such image-processing systems, however, often do not handle soft shadow boundaries well and can produce visible artifacts along the boundaries as a result. Other image-processing systems attempt to overcome deficiencies with handling soft shadows by estimating shadow density directly using patch lightness and applying color adjustments for each penumbra region. While such methods are able to identify soft shadows in images or shadowed portions that primarily include the same texture, estimating shadow density in this manner may produce poor results for images that contain multiple textures or that include different textures within the shadowed regions.

Even if a shadow region is previously identified, manually or otherwise, shadow removal is nonetheless challenging. In particular, simple color and intensity correction of shadowed pixels does not usually produce good results in the presence of soft shadows and/or complex spatially-varying textures. As such, many conventional image-processing systems are not able to produce high quality shadow removal on anything but simple scenes.

These and other disadvantages may exist with respect to identification and removal of shadows from digital images.

SUMMARY

One or more embodiments provide benefits and/or solve one or more of the foregoing or other problems in the art with systems and methods for detecting and removing cast shadows from an image. In one or more embodiments, the systems and methods automatically and accurately identify cast shadows in a digital image. Specially, one or more embodiments allow for automatic identification of cast shadows even when the shadows are soft, contain multiple textures, or include different textures within the shadowed regions. Furthermore, the systems and methods additionally automatically and accurately remove identified shadows from digital images. In particular, the systems and methods allow for removal of shadows despite the presence of soft shadows and/or complex spatially-varying textures, while still producing a high quality result.

Regarding shadow identification, the systems and methods leverage the fact that textures in the shadowed regions of digital photographs are often repeated in non-shadowed regions of the digital photographs. Specifically, the system and methods use a specialized patch correspondence/match procedure that finds dense matches between shadow and non-shadow regions. The systems and methods detect shadows in the image based on specific features of the similar image patches. One or more embodiments segment the detected shadows into one or more shadow regions based on luminance variations of the detected shadows. The systems and methods then identify cast shadows based on the shadow regions to generate a cast shadow map for the input image. Detecting shadows based on similar image patches spatially spread throughout an image allows the systems and methods to automatically identify cast shadows in the image without requiring a user to provide manual input.

Regarding shadow removal, the systems and methods also remove shadows from input images using patch-based synthesis. Specifically, the systems and methods use shadow parameters identified for each pixel corresponding to the cast shadow to generate a naïve inversion of the input image by subtracting a bias value from the identified shadow parameters. Additionally, the systems and methods remove the cast shadow by synthesizing image patches corresponding to the cast shadow based on non-shadow image patches from the input image and a plurality of image patches from the naïve inversion of the input image. By synthesizing pixels corresponding to the identified cast shadow using pixels from the non-shadowed regions of the input image and from the naïve inversion of the input image, the methods and systems can provide higher accuracy in color and luminance properties of the synthesized result.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which:

FIGS. 6A-6F illustrate embodiments of images in association with a shadow detection process in accordance with one or more embodiments;

FIGS. 7A-7F illustrate embodiments of images in association with a patch-based synthesis process in accordance with one or more embodiments;

DETAILED DESCRIPTION

Figure 1:
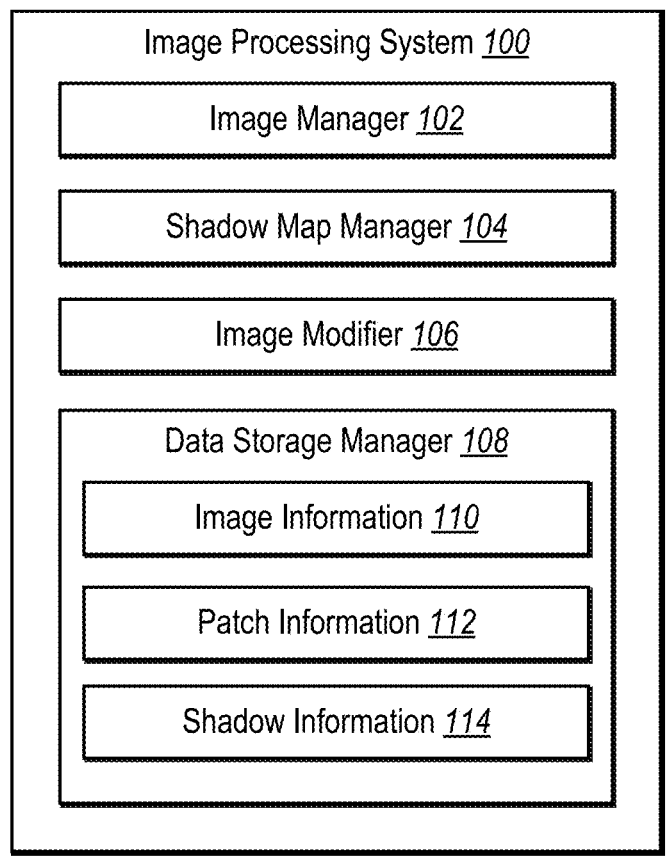
FIG. 1 illustrates a schematic overview of an image processing system in accordance with one or more embodiments.

One or more embodiments of the present disclosure include an image processing system that detects shadows in digital images without manual user input. The image processing system can also remove shadows from digital images to produce quality images. In particular, the image processing system can detect shadows in an input image based on identified visual similarities between shadowed and non-shadowed image patches within the input image. One or more embodiments of the image processing system also use the detected shadows to identify cast shadows within the image. Additionally, one or more embodiments of the image processing system remove or modify identified cast shadows from the input image. Specifically, the image processing system synthesizes shadowed image patches in the input image based on image patches in the input image and image patches from a rough estimate of the image without the cast shadow.

In one or more embodiments, the image processing system uses a patch-matching algorithm to identify correspondences (e.g., similarities of certain visual properties) between shadowed and non-shadowed image patches of an input image. Specifically, the image processing system can use a patch-matching algorithm that identifies similar image patches that are spatially spread throughout the input image. By identifying spatially spread image patch correspondences throughout the input image, the image processing system can increase the likelihood of correctly distinguishing shadowed and non-shadowed image patches of the same texture. After identifying pairs of similar image patches, the image processing system can generate a shadow map that roughly divides the image into shadowed regions and non-shadowed regions. In particular, the image processing system can compare each patch with the brightest matching patch. The image processing system uses a luminance ratio between these patches as a shadow density, which in turn produces a naïve shadow map. The image processing system can then refine the naïve shadow map to produce an all-shadow map that shows the shadow regions in the image.

Additionally, the image processing system can identify cast shadows from the all-shadow map. In particular, the image processing system can identify which shadows of the detected shadows of the input image are cast shadows. For example, the image processing system can identify cast shadows from the detected shadows by predicting cast shadows from the detected shadows based on probabilities assigned to separate shadow regions. The image processing system can also determine that adjacent shadow regions are part of the same cast shadow based on certain visual properties of the shadow regions. Optionally, the image processing system and iteratively repeat the shadow identification process to identify two layers of shadows or multiple shadows.

According to one or more embodiments, the image processing system can modify/remove cast shadows from an input image. For example, the image processing system can remove cast shadows from the input image to create a synthesized image that estimates what the input image would be without the cast shadows. To illustrate, the image processing system can identify a plurality of image patches corresponding to a cast shadow and modify one or more visual properties of the identified image patches. The image processing system can thus create a synthesized image from the input image with a plurality of modified image patches to simulate the input image without the cast shadow.

In one or more embodiments, the image processing system can synthesize image patches corresponding to the cast shadows to create a final synthesis result in a process that is guided by a naïve inversion of the input image (e.g., a rough estimate of the input image). Specifically, the image processing system can generate an initial synthesis result that synthesizes the shadowed image patches using similar non-shadowed image patches. Further, the image processing system can also generate the naïve inversion of the input image by modifying each pixel independently based on properties of the identified cast shadow. The image processing system can use the initial synthesis result and the naïve inversion to create a final synthesis result that provides a more accurate estimate of the input image without the cast shadows than either the initial synthesis result or the naïve inversion alone. Optionally, the image processing system and iteratively repeat the shadow identification removal to remove two layers of shadows or multiple shadows.

As described in greater detail below with regard to identifying shadows and cast shadows in an input image, the image processing system can distinguish between shadowed and non-shadowed areas in an image based on the content of the image. Furthermore, the image processing system can distinguish between shadows created by objects within the image and shadows cast by objects located outside the image frame, as well as distinguish between shadows in a multi-layered shadow region. Thus, the image processing system can accurately identify cast shadows for removal from the image without requiring a user to manually identify the shadows, which can be a tedious and inaccurate process.

More specifically, the image processing system can determine, for image patches in the input image, nearest neighbor patches that have one or more similar visual features to the corresponding image patch, such as texture. Specifically, the image processing system can identify nearest neighbor patches by segmenting the input image into a plurality of grid cells and selecting one or more nearest neighbor patches from some or all of the grids cell using a grid-based generalized patch match (GGPM) algorithm. Because the nearest neighbor patches are spatially spread across the grid cells, the nearest neighbor patches can include both shadowed and non-shadowed image patches. Additionally, by constraining the selection of nearest neighbor patches for an image patch to be spatially spread across the plurality of grid cells, the image processing system can increase the probability of finding shadow-invariant correspondences for each image patch.

Once the corresponding image patches are identified, the image processing system can extract feature vectors (e.g., features of the selected color space, matching cost, and spatial offsets) of each image patch and the corresponding nearest neighbor patches to identify shadow parameters for detecting shadows in the image. In particular, the image processing system can create a concatenated or combined feature vector that includes ranked feature vectors for matching pairs associated with an image patch and the corresponding nearest neighbor patches. By applying a regression algorithm, such as a regression random forest (RRF) algorithm, to the concatenated feature vectors, the image processing system can estimate shadow parameters for creating a shadow map that defines shadows within the image.

According to one or more embodiments, the image processing system can distinguish between detected shadows to determine which shadows correspond to objects outside the image for removal or modification. Specifically, the image processing system can segment the detected shadows into different shadow regions based on luminance variations of the shadows in the shadow map. The image processing system can identify cast shadows by determining that a shadow region is or belongs to a cast shadow using a trained decision tree that determines the probability that each shadow region is the cast shadow and storing the results in a cast shadow map.

Additionally, the image processing system can determine that darker shadow regions adjacent to an identified shadow region are part of the cast shadow if the adjacent regions are darker than the identified region. For example, shadow regions adjacent to the identified region that have luminance gain values lower than the luminance gain value of the identified region may be shadows on a different texture, but are still part of the cast shadow. Thus, the image processing system can identify the cast shadow even if the cast shadow covers multiple objects and backgrounds in the image.

With regard to removing or otherwise modifying identified cast shadows in an input image, the image processing system identifies shadow parameters associated with previously identified cast shadows in the input image and generates a naïve inversion of the input image based on the identified shadow parameters. The image processing system uses the shadow parameters to set a luminance of pixels corresponding to the cast shadow to a luminance threshold for the naïve inversion of the image. Additionally, the image processing system can remove the cast shadow from the image by synthesizing the pixels corresponding to the cast shadow based on pixels in the input image. The image processing system can also use the naïve inversion of the image to correct the resulting image for areas that did not properly synthesize.

More specifically, once the cast shadow is identified, one or more embodiments of the image processing system can generate a naïve inversion of the image based on the shadow parameters of the image. For example, the image processing system can identify the shadow parameters for the pixels corresponding to the cast shadow and set color space parameters of each pixel corresponding to the cast shadow at a corresponding parameter threshold based on the shadow parameters. Specifically, the image processing system can modify one or more color space parameters (e.g., gain and/or bias values) by reducing the corresponding color space parameters in accordance with the shadow parameters. Thus, the image processing system can first generate a rough estimate of the image without the cast shadow by creating the naïve inversion.

The image processing system can then synthesize the image patches of the cast shadow based on an initial synthesis result and the naïve inversion of the image. Specifically, the image processing system can determine a synthesis confidence for each image pixel in the shadow of the initial synthesis result. For pixels with a high confidence value, the image processing system can use the pixels from the initial synthesis result to overwrite the corresponding pixels in the naïve inversion of the image. For pixels with a low confidence value, the image processing system can use the corresponding pixels in the naïve inversion of the image by modifying the pixels in the naïve inversion based on similar pixels that have a high confidence value. Thus, the image processing system creates a fusion of the initial synthesis result and the naïve inversion having a higher accuracy in estimating pixel properties without the cast shadow than either the initial synthesis result or the naïve inversion alone.

As used herein, the term "cast shadow" refers to a shadow cast in the image by an object or figure onto another object or figure (rather than a "self shadow," which includes a shadow resulting on the object that caused the shadow). For example, the object or figure can be a foreground object at least partially within a border or frame of the image, or an object completely outside the border or frame of the image. To illustrate, if a light source is located at least partially behind a person capturing an image, the light source may create a cast shadow of the person that at least partially covers one or more objects or background elements of the image. The image processing system described herein may detect and remove, shift, rotate, replace, or otherwise adjust an appearance of cast shadows in the image from objects within and/or outside the image.

As used herein, the term "shadow parameter" refers to a parameter that describes shadow aspects of an image patch.

For example, shadow parameters for an image patch may include one or more values of a selected color space (e.g., gain or bias values) for the image, as well as information for the corresponding image patch. The image processing system can use the shadow parameters of the image patches from the image to identify and distinguish shadows in the image.

FIG. 1 illustrates a schematic overview of one embodiment of an image processing system 100. The image processing system 100 may include, but is not limited to, an image manager 102, a shadow map manager 104, an image modifier 106, and a data storage manager 108. Each of the components of the image processing system 100 can be in communication with one another using any suitable communication technologies. It will be recognized that although the components of the image processing system 100 are shown to be separate in FIG. 1, any of components may be combined into fewer components, such as into a single component, or divided into more components as may serve a particular implementation.

The components can comprise software, hardware, or both. For example, the components can comprise one or more instructions stored on a computer-readable storage medium and executable by processors of one or more computing devices (e.g., client devices and/or server devices). When executed by the one or more processors, the computer-executable instructions of the image processing system 100 can cause the computing device(s) to perform the image enhancement methods described herein. Alternatively, the components can comprise hardware, such as a special purpose processing device to perform a certain function or group of functions. Additionally or alternatively, the components can comprise a combination of computer-executable instructions and hardware.

Furthermore, the components of the image processing system 100 may, for example, be implemented as a stand-alone application, as a module of an application, as a plug-in for applications including image processing applications, as a library function or functions that may be called by other applications such as image processing applications, and/or as a cloud-computing model. Thus, the components of the image processing system 100 may be implemented as a stand-alone application, such as a desktop computer application or a mobile device application. Alternatively or additionally, the components of the image processing system 100 may be implemented in any image processing application, including but not limited to ADOBE PHOTOSHOP, ADOBE PHOTOSHOP ELEMENTS, and ADOBE ILLUSTRATOR. "ADOBE", "PHOTOSHOP", "ELEMENTS", and "ILLUSTRATOR" are registered trademarks of Adobe Systems Incorporated in the United States and/or other countries.

As mentioned above, the image processing system 100 can include an image manager 102. In one or more embodiments, the image manager 102 facilitates management of images within the image processing system 100. For example, the image manager 102 can receive an image input for performing a particular shadow detection or shadow modification operation. To illustrate, the image manager 102 can receive an image as part of an input from a user to detect a shadow and/or to remove a shadow from the image.

Additionally, the image manager 102 can determine a number of image patches for the image. As used herein, the term "image patch" refers to a patch or group of pixels having a specific size, shape, and location corresponding to an image. For example, image patches can have a predetermined pixel width/height (e.g., 5x5) and a location for each image patch can be defined based on one or more center pixels.

Determining a number of image patches can include determining a number of pixels in the image. In some instances, each pixel can have a corresponding image patch with the pixel at or near the center of the image patch such that the number of image patches is equal to the number of pixels in the image. Thus, image patches corresponding to adjacent image pixels overlap can each other.

The image processing system 100 can also include a shadow map manager 104 to identify shadows within the image. In one embodiment, the shadow map manager 104 is able to first identify shadows within the image based on the determined image patches. For example, the shadow map manager 104 can segment the detected shadows into shadow regions for use in identifying one or more cast shadows in the image. Specifically, the shadow map manager 104 can determine that one or more shadow regions correspond to a cast shadow. The shadow map manager 104 can generate a cast shadow map from the identified cast shadow(s) that defines the cast shadows in the image.

The image processing system 100 can also include an image modifier 106 to modify an image by removing and/or otherwise making changes to identified cast shadows in the image. For example, the image modifier 106 can modify visual properties of pixels corresponding to the identified cast shadows to make the image appear as if the identified cast shadows were not present in the image. Alternatively, the image modifier 106 can modify the cast shadows in other visible ways by changing the visual properties of shadow and/or non-shadow pixels within the image.

Modifications to the image may involve the creation of one or more derivative images based on the input image for use in various processing steps. For example, the image modifier 106 can create a naïve inversion and/or a synthesized version of the image for use in creating a final image with the desired modifications. The image modifier 106 can communicate with the image manager 102 and the data storage manager 108 for receiving and storing the final image, as well as any intermediate images for generating the final image.

The image processing system 100 can also include a data storage manager 108 to facilitate storage of information for the shadow detection and removal processes. In particular, the data storage manager 108 can store information used by one or more of the components in the image processing system 100 to facilitate the performance of various operations associated with image enhancement. In one embodiment as shown in FIG. 1, the data storage manager 108 maintains image information 110, patch information 112, and shadow information 114. The data storage manager 108 may also store any additional or alternative information corresponding to the operation of the image processing system 100. The data storage manager 108 can maintain additional or alternative data as may serve a particular implementation. The data storage manager 108 may communicate with any component within the image processing system 100 to obtain information for storing, managing, and enhancing images associated with the image processing system 100. In one embodiment, the data storage manager 108 includes one or more servers on which images or other information is stored. For example, the data storage manger may include a distributed storage environment.

In some instances, the image information 110 can include data corresponding to an input image. In particular, the image information 110 may allow the shadow map manager 104 and the image modifier 106 to obtain image data necessary for performing shadow detection and removal/modification. For example, the image information 110 may include an image, a source or a location of the image, a size of the image, a number of pixels in the image, content of each of the pixels, colors used in the image, and/or other information corresponding to the image.

Additionally, the image information 110 can include data corresponding to images created during one or more of the operations of shadow detection/removal. Specifically, the shadow detection/removal process may include generating one or more images to compare to or combine with the input image or another image derived from the input image. For example, the image information 110 can include data for a naïve inversion of the input image, an initial synthesis result, and/or a final synthesis result.

In one or more embodiments, the patch information 112 can include data corresponding to image patches in the image. In particular, the patch information 112 can provide information for each of the image patches in the image. For example, the patch information 112 may include a location of one or more central pixels corresponding to each image patch, a size of each image patch, and/or other information corresponding to the image patches.

One or more embodiments of the data storage manager 108 may also maintain shadow information 114. In particular, the data storage manager 108 may store shadow parameters that the shadow map manager 104 has extracted from the image patches in the image. The shadow parameters allow the shadow map manager 104 to define a shadow map including the shadows within the image. The shadow parameters also allow the shadow map manager 104 to further define a cast shadow map including one or more cast shadows within the image.

Additionally, the shadow parameters can include one or more parameters that describe color information for the image patches, as previously mentioned. For example, the shadow information 114 can include color information for the pixels based on a selected color space for the shadow detection and removal processes. To illustrate, the shadow information 114 can include color space parameters in the CIELab color space, as described in more detail below, for each pixel and/or each image patch in the image.

Although the data storage manager 108 in FIG. 1 is described to include the image information 110, the patch information 112, and the shadow information 114, the data storage manager 108 can include additional or alternative information related to the image processing system 100, as previously mentioned. Additionally, the data storage manager 108 can include information for other types of systems and processes. For example, the data storage manager 108 can manage or communicate with a distributed storage space configured to interface with one or more devices or systems in addition to the image processing system 100, allowing the different devices/systems to interact with one another.

As previously mentioned, the image processing system 100 can identify dense correspondence between matching shadowed and non-shadowed pixels to estimate local shadow parameters (including luminance differences caused by the shadows) and allow for automatic shadow detection. In one or more embodiments, the image processing system 100 can compute such correspondences at a patch level rather than a pixel level, thereby, allowing the image processing system 100 to match texture in shadowed and non-shadowed regions. Additionally, as described in greater detail below, the image processing system 100 can use a generalized patch match (GPM) for finding such correspondences to help ensure that the correspondences are invariant to geometric variations such as rotations and scales and photometric differences caused by illumination. To alleviate the convergence problem of the GPM and improve matching accuracy, the image processing system 100 can bootstrap the GPM with parameters of a shadow model that are learned from a training dataset.

In one or more embodiments, the shadow model can describe an appearance difference between a shadowed image patch and an estimated non-shadowed version of the shadowed image patch. In particular, the color change caused by shadowing of a pixel can be expressed as:

$$I_p^s = G_p \cdot I_p + B_p$$

where $I_p^s$ and $I_p$ are shadowed and non-shadowed color vectors at p, $G_p$ is a diagonal matrix where the $i^{th}$ diagonal element is the gain of the $i^{th}$ color channel, and $B_p$ is a color bias vector. Because shadow maps including shadows identified in images are usually smooth, one or more embodiments of the image processing system 100 can assume that the shadow map is constant within a small image patch (e.g., 5 pixels by 5 pixels). Additionally, image patches of the same texture in a single image may also be assumed to have the same appearance. Such assumptions allow for the substitution of a pixel q with a patch P in the previous equation as:

$$R_P^s(c) = g_P(c) * R_P(c) + b_P(c)$$

where c is the color channel index, $R_P^s$ and $R_P$ are shadowed and non-shadowed patch color matrices, and $g_P$ and $b_P$ are gain and bias values, respectively.

According to one or more embodiments, aspects of the shadow model described above can include: (1) the color space to be used for the model; (2) whether gain value(s) and/or bias value(s) are used for each channel of the color space; and (3) ranges for the gain value(s) and bias value(s). To identify these aspects of the shadow model, the image processing system 100 can use a set of training images to train the shadow model. The set of training images can include a plurality of image pairs, where each pair includes two images of the same scene—a first image with a cast shadow to be removed and a second image without the cast shadow. The training images can also include images with different luminance conditions (e.g., indoor and outdoor images with different lighting) to improve the diversity of the training dataset. Thus, the training images can allow the image processing system 100 to train the shadow model to select the color space and gain/bias value(s) to accurately detect shadows in an input image.

Figure 2:
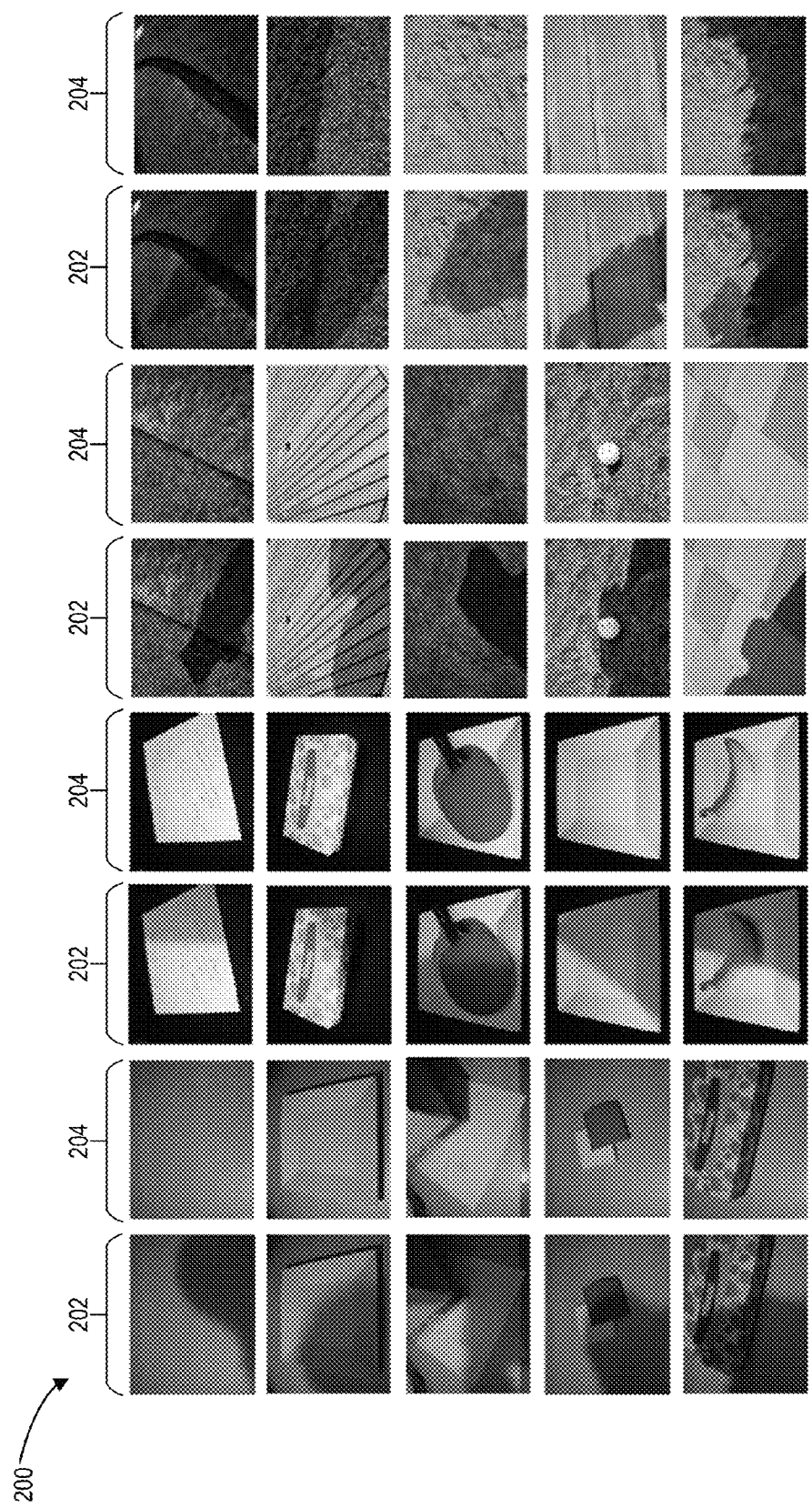
FIG. 2 illustrates a set of training images for training algorithms in shadow detection and removal processes in accordance with one or more embodiments.

Referring to FIG. 2, same sample image pairs 200 of a set of training images are illustrated. As shown, the set of training mages can include image pairs of different indoor and outdoor scenes captured in different lighting conditions (in this case four different conditions). Each image pair includes a shadowed image 202 and a non-shadowed image 204 of the same scene as ground truth, captured in quick succession with the same camera, viewpoint, and illumination settings. FIG. 2 illustrates 20 image pairs from a set of 90 image pairs.

Table 1 illustrates approximation errors of different shadow model settings in different color spaces for the training images 200 of FIG. 2. Specifically, the different color spaces include log-chromaticity, HLS, RGB, and CIELab color spaces. Each color space has a variety of gain/bias settings in different channels for the color spaces, such as gain only in the L channel in the HLS color space (i.e., model 2 in Table 1), or gain in the L channel and bias in the a, b channels of the CIELab color space (i.e., model 9 in Table 1). The "No." column is the number or parameters in the model.

TABLE 1

| | Space | Parameters | No. | Error |
|---|---|---|---|---|
| 1 | Log-chr. | N/A | N/A | 0.081 |
| 2 | HLS | Gain(L) | 1 | 0.091 |
| 3 | | Gain(L), Bias(L) | 2 | 0.087 |
| 4 | | Gain(L), Bias(H/L/S) | 3 | 0.036 |
| 5 | RGB | Gain(R/G/B) | 3 | 0.029 |
| 6 | | Gain(R/G/B), Bias(R/G/B) | 6 | 0.028 |
| 7 | CIELab | Gain(L) | 1 | 0.095 |
| 8 | | Gain(L), Bias(L) | 2 | 0.088 |
| 9 | | Gain(L), Bias(a/b) | 3 | 0.041 |
| 10 | | Gain(L), Bias(L/a/b) | 4 | 0.030 |

To determine a color space for the shadow model, the image processing system 100 extracts 5×5 image patch pairs of shadowed and non-shadowed image patches in the training images. The image processing system 100 also determines which gain/bias values that have the lowest matching error for the corresponding models, shown in Table 1. If both gain and bias values are enabled for a channel, the image processing system 100 can compute the gain/bias values by matching the mean and standard variation of the shadowed/non-shadowed image patch pairs.

As illustrated in Table 1, the image processing system 100 achieves approximation errors with models 4, 5, 6, 9, and 10 that are significantly lower than the other models. Table 2 shows the computed ranges of the corresponding parameters that result in the lowest matching error for models 4, 5, 9, and 10 (model 6 is excluded because model 6 has a greater number of parameters).

TABLE 2

| | Param. | Range |
|---|---|---|
| 4 | Bias(H) | (−0.54, 0.03) |
| | Gain(L) | (0.46, 1.52) |
| | Bias(L) | (0.05, 0.33) |
| | Bias(S) | (−0.34, 0.61) |
| 5 | Gain(R) | (0.24, 0.82) |
| | Gain(G) | (0.41, 0.81) |
| | Gain(B) | (0.41, 0.82) |
| 10 | Gain(L) | (0.49, 1.64) |
| | Bias(L) | (0.06, 0.35) |
| | Bias(a) | (−0.02, 0.04) |
| | Bias(b) | (−0.02, 0.07) |
| 9 | Gain(L) | (0.43, 0.81) |
| | Bias(a) | (−0.02, 0.04) |
| | Bias(b) | (−0.02, 0.07) |

The illustrated parameter ranges cover 80% of the pixels in the set of training images 200. Specifically, the image processing system 100 accumulates ground truth values from the set of training images to form a histogram and removes the lowest 10% values and the highest 10% values. Alternatively, the image processing system 100 may select parameter ranges that cover other amounts of the pixels in the set of training images, as described in more detail below with regard to the training of the GGPM algorithm.

As shown, model 9 (corresponding to the CIELab color space with a luminance gain value and a/b bias values) has a narrow range of parameter values relative to the other models while also having a low matching error. Thus, model 9 can be useful in the GGPM algorithm described herein to reduce the likelihood of false positive matches. The 3-channel parameter matrix, also referred to herein as a shadow map, corresponding to model 9 can be represented as $S=(g^l, b^A b^B)$. Although the image processing system 100 described herein uses the CIELab color space with a luminance gain value and a/b bias values, the image processing system 100 may use a different color space with different parameters, such as one of the other models shown in Table 1.

After selecting a color space and the appropriate parameters for identifying shadows in an input image, the image processing system 100 can generate the shadow map using patch-based processes. In one or more embodiments, the image processing system 100 can generate an all shadow map, $S_r$, which includes detected shadows in the input image (or in a selected portion of the input image, if guided by user input), including cast shadows from objects outside the image, cast shadows from within the image, shadows caused by inter-object occlusion, etc. As briefly mentioned previously, generating the all shadow map, $S_r$, can include applying a GGPM algorithm to image patches in the input image to identify correspondences between patches in the image. Furthermore, generating the all shadow map, $S_r$, can include training and applying a Regression Random Forest (RRF) algorithm to predict $S_r$ from the identified correspondences.

In one or more embodiments, the image processing system 100 can use patch-based processes to all identified image patches in the image. Alternatively, the image processing system 100 can apply the patch-based processes to a subset of image patches in the image. For example, the image processing system 100 may allow a user to manually select a portion of an image containing shadows to limit the number of total image patches and reduce processing time.

When applying the GGPM algorithm to an image patch in the input image, the image processing system 100 finds the k-nearest neighbor patches within the input image. The k-nearest neighbor patches have similar visual characteristics to the image patch, particularly in relation to the parameters in the chosen color space. For example, the nearest neighbor patches can include one or more similar color space parameters to the selected image patch. To illustrate, FIG. 3 illustrates an input image 300 with a selected image patch 302 and a plurality of nearest neighbor patches 304 for the selected image patch 302.

Figure 3:
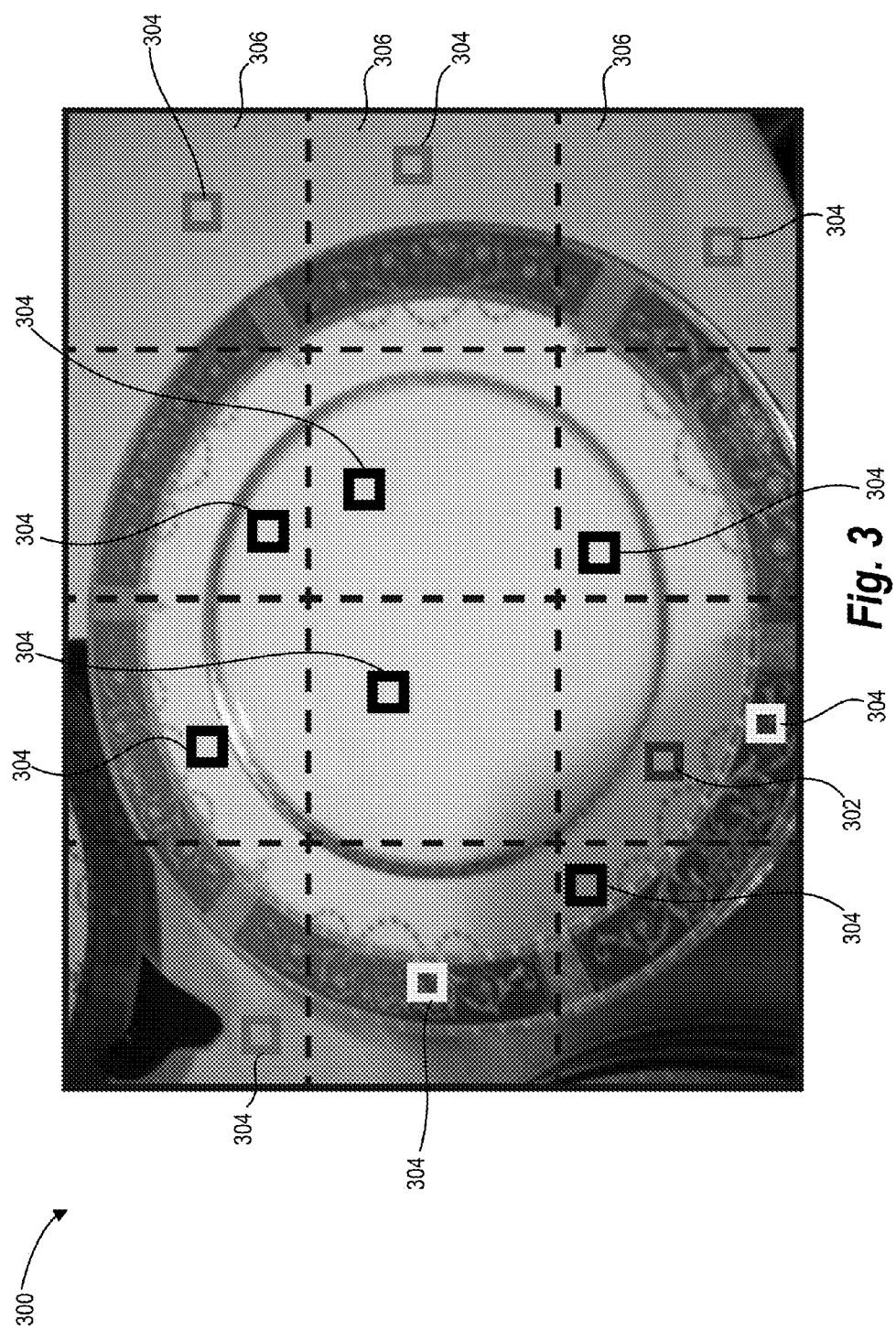
FIG. 3 illustrates nearest neighbor patches for a selected image patch in an input image in accordance with one or more embodiments.

As shown in FIG. 3, the GGPM algorithm constrains the nearest neighbor patches 304 for a selected image patch 302 to be spatially spread within the image. In particular, rather than finding the most similar matches based on a patch distance metric such as sum of squared differences, the GGPM attempts to find both shadowed and non-shadowed matching pairs of image patches. By using a grid-based generalized patch-matching algorithm, the image processing system 100 can increase the probability of finding shadow-invariant matches over a non-grid-based algorithm.

For example, to constrain the nearest neighbor patches 304 to be spatially spread within the image, the image processing system 100 can segment the input image 300 into a plurality of grid cells 306. In one or more embodiments, the image processing system 100 can segment the input image I 300 into K grid cell 306 and apply a generalized patch-matching (GPM) algorithm to each grid cell $I_k$ 306 independently to find a single nearest neighbor patch 304 in each grid cell 306. As a result, the image processing system 100 obtains K nearest neighbor patches $P_i^k (P_i^k \in I_k)$ for each image patch $P_i$ in the input image I 300, with the K nearest neighbor patches 304 being spatially distributed across the image to cover appearance variations of the same texture.

According to one or more embodiments, the image processing system 100 can automatically segment the image into grid cells 306 of equal sizes. For example, the image processing system 100 can segment the image of FIG. 3 into a 4×3 grid (i.e., K=12). Alternatively, the image processing system 100 can segment the image into grid cells 306 of varying sizes. Additionally, when segmenting the image into grid cells 306, the image processing system 100 can down-sample the image to a smaller resolution if the image is above a certain resolution. For example, the image processing system 100 can down-sample the image to 600×450 pixels.

Because the GGPM algorithm allows the image processing system 100 to spatially distribute the nearest neighbor patches 304, material ambiguities at the image patch level may produce correspondences of varying qualities. Specifically, the correspondences may fall into three categories: (1) good/desired matches, (2) bad matches, and (3) wrong matches. The image processing system 100 can tune parameters of the GGPM algorithm to increase the number of desired matches and to reduce the number of bad matches and wrong matches.

In one or more embodiments, a desired match includes a shadowed image patch (e.g., the selected image patch 302) that is matched to a non-shadowed patch (e.g., one of the nearest neighbor patches 304) of the same texture, which may be determined by comparing a matching cost of the patch pair that meets (i.e., is less than) a cost threshold θ. A bad match includes a patch pair with a matching cost that does not meet (i.e., is greater than) the cost threshold θ, indicating that the selected image patch 302 and the nearest neighbor patch 304 corresponding to the bad match may not have the same texture. A wrong match includes a patch pair with a matching cost that meets the cost threshold θ, but is still not a desired match. An example of a wrong match may be two shadowed image patches in different grid cells 306 that do not have the same texture.

Figure 4:
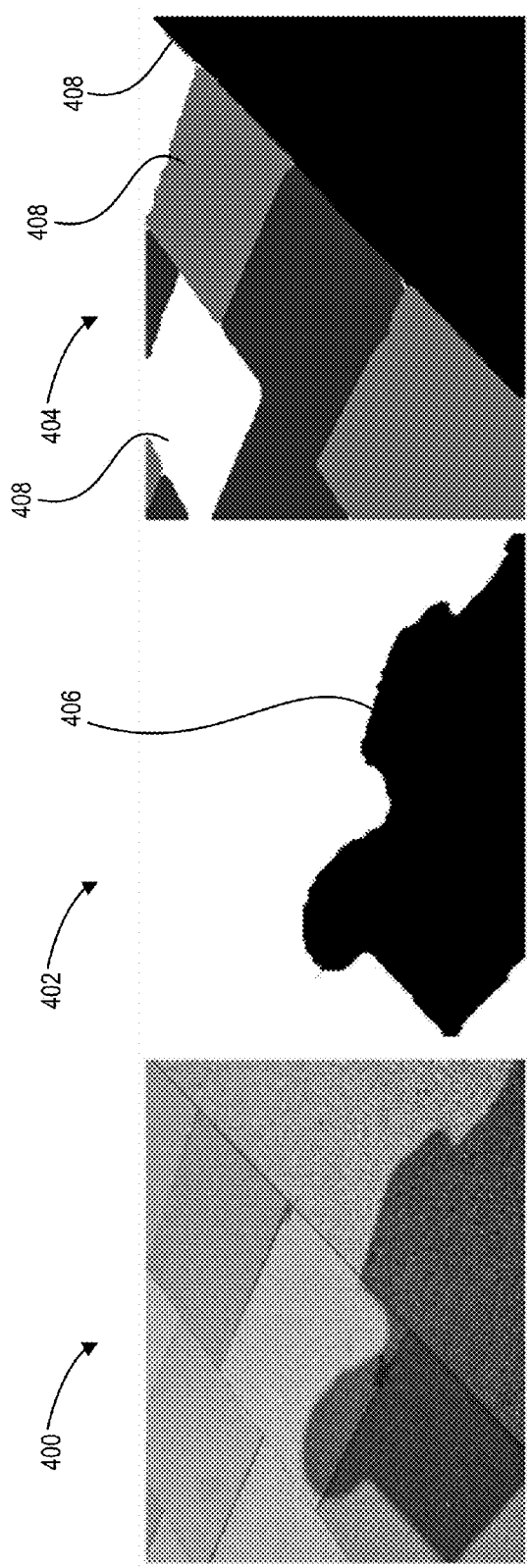
FIGS. 4A-4C illustrate a plurality of versions of a training image in accordance with one or more embodiments.

To improve the performance of the GGPM algorithm, one or more embodiments of the image processing system 100 may apply the GGPM algorithm to a set of training images, such as the set of training images 200 in FIG. 2, with different parameter range settings. In particular, a user (e.g., a developer) can manually separate each of the training images into ground truth shadow/non-shadow components and coherent texture regions. FIGS. 4A-4C illustrate a training image 400, a shadow image 402 with manually labeled shadows of the training image, and a texture image 404 with manually labeled textures of the training image 406.

According to one or more embodiments, the image processing system 100 can receive a user input to manually label one or more shadows for the training image 400 of FIG. 4A. Specifically, the user can manually mark shadowed regions 406 to create the shadow image 402 by selecting the corresponding regions in the training image 400 with an input device. Upon manual identification of the shadowed regions 406, the image processing system 100 can store the manually labeled shadowed regions 406 in the shadow image 402, as shown in FIG. 4B. The user can similarly perform manual identification of shadows for a plurality of training images to store in individual shadow maps. Additionally, or alternatively, the user can label non-shadowed regions in the training image.

FIG. 4C illustrates manually labeled textures in a texture image 404 for the training image 400. Specifically, the user can provide an input to manually identify different coherent/visible texture regions 408. For example, the user can manually label the texture regions 408 corresponding to different objects/backgrounds or portions of objects/backgrounds within a single image. After receiving the input from the user, the image processing system 100 can store the manually labeled texture regions 408 in the texture image 404. Similarly, the image processing system 100 can store manually labeled texture regions 408 for each of the training images in individual texture maps. In one or more embodiments, at least part of the manual labeling of shadows and textures can be automated, and the user may fine-tune the resulting shadow images and texture images.

In one or more embodiments, the image processing system 100 can apply the GGPM to the manually generated shadow and texture images for the set of training images to calculate matching recall and precision of the GGPM algorithm. In one or more embodiments, the precision (i.e., the positive predictive value of the GGPM algorithm) is represented as:

$$\text{Precision}(\theta) = \frac{|M_d(\theta)|}{|M_d(\theta)| + |M_w(\theta)|}$$

and the recall (i.e., the sensitivity of the GGPM algorithm) is represented as:

$$\text{Recall}(\theta) = \frac{|M_d(\theta)|}{|P_{shadow}| * K}$$

where $M_b$ represents bad matches, $M_d$ represents desired matches, $M_w$ represents wrong matches, θ is a threshold based on a specific gain/bias range setting, $P_{shadow}$ is the set of all shadow patches in the source (training) images, and |·| denotes the cardinality of a set.

Figure 5:
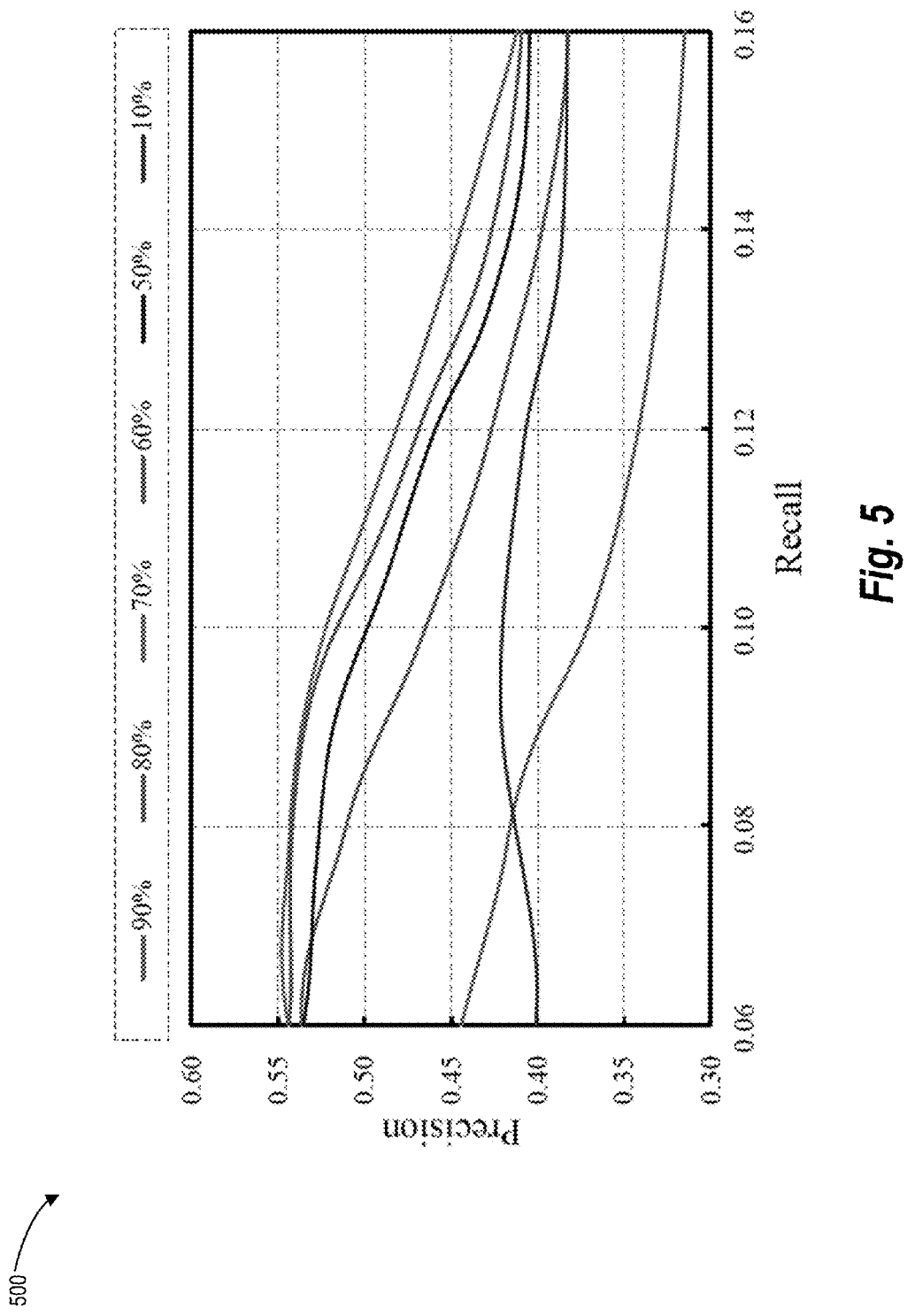
FIG. 5 illustrates a graph diagram of precision and recall curves corresponding to a patch matching algorithm in accordance with one or more embodiments.

FIG. 5 illustrates a graph 500 showing precision and recall curves for different range settings for the gain and bias settings of the GGPM algorithm on the set of training images 200 corresponding to FIG. 2. Specifically, the candidate range settings are extracted from the ground truth parameters in the set of training images 200 to cover 90%, 80%, 70%, 60%, 50%, and 10% of the shadowed pixels in the set of training images 200. According to one or more embodiments, the range setting corresponding to 70% pixel coverage with a luminance gain range of (0.46, 0.76), a bias(a) range of (−0.01, 0.03), and a bias(b) range of (−0.01, 0.13) provides a balance of precision and recall to be used with the GGPM described herein. In other implementations, such as with another color space or with other parameters, the image processing system 100 can use different parameter ranges corresponding to a different pixel coverage for an input image.

In one or more embodiments, the GGPM algorithm may include parameters in addition to the gain and bias values for the CIELab color space. For example, the GGPM algorithm may use scaling, rotation, and mirroring parameters of the input image to identify nearest neighbor patches for each image patch in the input image. In one example, the scaling and rotation may be set to (0.67, 1.5) and (185°, −185°), respectively. Additionally, for each grid cell, the image processing system 100 may apply the GGPM algorithm in a coarse-to-fine manner by using a Gaussian pyramid with an inter-scale down-sampling ratio of 0.8, and a height of the coarsest layer of at least 25 pixels. In other embodiments, the image processing system 100 may use other settings for the GGPM algorithm based on the selected color space or desired results.

As described above, the image processing system 100 may discover patch correspondences that allow the image processing system 100 to accurately identify desired matches between image patches and the corresponding nearest neighbor patches. Increasing the number of desired matches for patch correspondences increases the accuracy of shadow detection. Thus, training the GGPM algorithm and selecting the color space model using one or more sets of training images can improve the accuracy of the shadow detection process. Once the color space model and the GGPM algorithm are trained, a user may be able to detect shadows in an input image without requiring the user to provide additional input. Additionally, the image processing system 100 can further remove or otherwise modify shadows in the input image without further user input, as described in more detail below.

Identifying the All Shadow Map

By applying the GGPM algorithm to the grid cells of the input image, the image processing system 100 can learn shadow parameters based on features extracted from nearest neighbor patches of each image patch in the input image. Specifically, the GGPM algorithm obtains the K nearest neighbor patches $P_i^k$ ($P_i^k \in I_k$), and the image processing system 100 obtains shadow parameters $S_r$ ($P_i$) from extracted features of the nearest neighbor patches. For example, for each matching patch pair $(P, P^k)$, the GGPM algorithm can compute shadow parameters including a matching gain and/or bias and a matching cost. Additionally, the GGPM algorithm can determine spatial offsets for the image pairs.

With the aforementioned parameters, the GGPM algorithm can generate a 6-dimension feature vector for each matching pair, represented as:

$$F(p, P^k) = (g^L, b^A, b^B, \text{cost}, \Delta x, \Delta y)$$

where $\Delta x$, $\Delta y$ are the spatial offsets from P to $P^k$. The image processing system 100 can generate a final feature vector of P (as referred to herein as a concatenated or combined feature vector) containing all of the feature vectors of the corresponding nearest neighbor patches for a given image patch. For example, the image processing system 100 can generate the final feature vector by concatenating the feature vectors of the corresponding K nearest neighbor patches, the final feature vector represented as $F(P) = \{F(P, P^k)\}$, and having a dimension based on the number of nearest neighbor patches (i.e., 6*K).

In one or more embodiments, the image processing system 100 can organize the feature vectors of the corresponding nearest neighbor patches in the final feature vector. In particular, because the nearest neighbor patches for each image patch can have an arbitrary distribution in the grid cells with respect to the quality of the nearest neighbor patches (e.g., bad, desired, or wrong matches), the image processing system 100 may arrange the feature vectors in an order other than based on a grid index. Rather, in one or more embodiments, the image processing system 100 can arrange the feature vectors of the nearest neighbor patches in the concatenated feature vector based on a ranking that the image processing system 100 determines for each nearest neighbor patch. To illustrate, the image processing system 100 can rank the feature vectors for the nearest neighbor patches in a descending order of their luminance gain component, $g^L$, such that well-lit nearest neighbor patches (likely to be non-shadowed image patches) are positioned before darker patches (likely to be shadowed image patches) in the concatenated feature vector. Thus, the image processing system 100 can organize the feature vectors in an order that provides accuracy and consistency for identifying the shadows in the input image.

According to one or more embodiments, after determining the concatenated feature vector for each image patch in the pixel, the image processing system 100 can perform a naïve shadow prediction, $S_n$, based on the concatenated feature vector. Specifically, the image processing system 100 can select the patch pair with the smallest luminance gain value (i.e., the brightest patch) and a small matching error as a desired match for a shadowed source image patch. Based on the luminance ratios of identified patch pairs, the image processing system 100 can identify a shadow density for the image patches. To illustrate, the image processing system 100 can select the first patch pair in the concatenated feature vector to find the shadow parameters of the image patch P by computing:

$$\mathcal{K} \operatorname*{argmax}_{k} \frac{(\text{cost}(P, P^k) < \eta)}{g^L(P, P^k)}$$

The shadow parameters for the naïve shadow prediction, $S_n$, at p, the center pixel of image patch P are represented as:

$$S_n(p) = (g^L, b^A, b^B)(P, P^K)$$

The naïve shadow prediction, $S_n$, can produce a rough shadow map, but the shadow map is sensitive to the cost threshold $\eta$. Additionally, the naïve estimation, $S_n$, uses only one nearest neighbor patch while ignoring the rest of the nearest neighbor patches and their spatial distributions, which may result in sensitivity to matching errors. Thus, the image processing system 100 may use additional or alternative methods of estimating the shadow parameters from the nearest neighbor patches, as described below.

In one or more embodiments, the image processing system 100 may use a regression algorithm to estimate the shadow parameters for each image patch in the input image. Specifically, the image processing system 100 can use a trained RRF algorithm to estimate the shadow parameters based on all of the feature vectors in the concatenated feature vectors. For example, the image processing system 100 can first train the RRF algorithm and then apply the trained RRF algorithm to the results of the image patches and corresponding nearest neighbor patches to obtain the all shadow map $S_r$. The RRF algorithm can produce a smaller average per-pixel error than the naïve shadow prediction.

To illustrate, the image processing system 100 can train the RRF algorithm using a set of training images, such as the set of training images 200 described with reference to FIG. 2, to generate ground-truth shadow parameters $S_g$ (p) for all of the shadowed image patches in the set of training images. Additionally, the image processing system 100 can calculate the feature vectors $F(P, P^k)$ from the GGPM matching results. In one or more additional embodiments, the image processing system 100 can normalize F $(P, P^k)$ to [0,1].

Furthermore, the image processing system 100 can train the RRF algorithm by splitting the set of training images into a training dataset and a test dataset. In at least one implementation, the image processing system 100 can use 5×2 cross validation to avoid over-fitting the RRF algorithm to the set of training images. For instance, the image processing system 100 can set the RRF algorithm to use 100 decision trees with a maximum depth of 10 and a regression accuracy of 0.01. In other embodiments, the image processing system 100 can set the RRF algorithm to use a different number of decision trees with a different maximum depth and regression accuracy, as may depend on the selected color space or selected parameters of the color space.

Smoothing and Quantizing the All Shadow Map

After generating the all shadow map $S_r$ based on the identified shadow parameters, the image processing system 100 can then identify cast shadows in the input image. Specifically, the image processing system 100 can identify one or more cast shadows to remove or modify in the input image based on the shadow parameters. FIGS. 6A-6F illustrate embodiments of the input image and shadow maps based on the input image at various stages of the shadow detection process.

As mentioned previously, the RRF algorithm receives an input of the concatenated feature vectors from the GGPM algorithm and outputs shadow parameters for the image patches in the input image 600 illustrated in FIG. 6A. The image processing system 100 uses the shadow parameters for the image patches in the input image 600 to generate an all shadow map $S_r$ 602 shown in FIG. 6B, which includes all of the light variations in the input image 600. For example, the light variations can include cast shadows, shaded regions, or other shadows, and can also indicate non-shadowed regions in the input image 600.

After obtaining the all shadow map 602 the image processing system 100 can then identify one or more shadows to remove or modify in the input image 600. For example, the image processing system 100 can analyze a luminance gain map, $g_r^L$, from the all shadow map 602 to identify cast shadow regions in the input image 600. Specifically, the image processing system 100 can decompose the all shadow map 602 into a plurality of shadow regions to determine the cast shadow regions in the input image 600. From the cast shadow regions, the image processing system 100 can generate the cast shadow map, $S_c$, for use in removing or modifying the cast shadow(s) from the input image 600.

To illustrate, and as described in more detail below, the image processing system 100 can identify the cast shadows by optionally smoothing the all shadow map 602 (e.g., using a content-aware smoothing algorithm), and then quantizing and segmenting the all shadow map 602 into a plurality of shadow regions. For example, the image processing system 100 extracts features for each shadow region and uses a trained decision tree to predict or otherwise identify whether each shadow region is a cast shadow region. The image processing system 100 can use the predicted cast shadow region(s) to compute the luminance gain value, $g_c^L$, corresponding to the cast shadow. The image processing system 100 then uses the luminance gain value, $g_c^L$, to recover chrominance bias values, $b_c^{(A,B)}$. Together, $(g_c^L, b_c^A, b_c^B)$ define the final cast shadow map, $S_c$.

In one or more embodiments, the image processing system 100 can remove noise inserted into the all shadow map 602 by the RRF algorithm by applying a smoothing algorithm to the luminance gain map, $g_r^L$, corresponding to the all shadow map 602. In particular, the image processing system 100 can use an edge-aware smoothing algorithm to avoid smoothing the luminance gain map across different textures that have different shadow parameters. In one implementation, applying the smoothing algorithm can include applying a guided filter method to an initial luminance map of the all shadow map to obtain a smoothed luminance gain map. FIG. 6C illustrates the smoothed luminance gain map 604 based on the luminance gain map, $g_r^L$ associated with the all shadow map 602 of FIG. 6B.

After smoothing the luminance gain map, the image processing system 100 can then segment the smoothed luminance gain map 604 into a plurality of shadow regions based on one or more features of the different shadow regions. To illustrate, the image processing system 100 can decompose shadows into several adjacent regions, and heuristically analyze the adjacent regions to determine that the largest region has the largest probability to be the cast shadow. Specifically, the image processing system 100 can segment the detected shadows from the smoothed luminance gain map 604 into different regions corresponding to different shadows and/or different textures within the input image 600. For example, a shadow that extends across a plurality of textures may have different luminance gain values in each of the corresponding textures. By segmenting the shadows from the smoothed luminance gain map 604 into a plurality of spatially coherent shadow regions, the image processing system 100 can more easily identify the cast shadows to remove from the input image.

In one or more embodiments, the image processing system 100 can form a plurality of clusters from the smoothed luminance gain map 604. For example, the image processing system 100 can apply a clustering algorithm, such as a mean shift clustering algorithm, to the smoothed luminance gain map, $g_r^L$, to form a plurality of clusters, each centered around a cluster center (e.g., a center pixel or center pixels). Additionally, the clustering algorithm can define clusters by assigning each pixel in the smoothed luminance gain map to a corresponding cluster center. Adjacent pixels assigned to the same cluster center are thus considered to be part of the same shadow region, $R_j$, as illustrated in FIG. 6D. Specifically, FIG. 6D illustrates a segmented shadow map 606 that includes the plurality of shadow regions based on the smoothed luminance gain map 604. Thus, quantizing the luminance gain map allows the image processing system 100 to segment the shadow map for the input image 600, based on the degree of shadowing, into a plurality of spatially coherent shadow regions that are more easily identifiable by the system.

Identifying Cast Shadows from the All Shadow Map

In one or more embodiments, the image processing system 100 can use the segmented shadow regions to determine a set of visual features for each of the shadow regions. For example, the visual features can be represented as:

$$F(R_j) = (g_{avg}^L, size, bb, r_o)(R_j)$$

where $g_{avg}^L$ is the average gain of the luminance channel of the corresponding shadow region, and size and bb are the size and bounding box of the shadow region, respectively. According to one or more implementations, the image processing system 100 can normalize the size and bounding box with respect to the size of the input image. Additionally, r, contains encoded shape information that describes how much of the bounding box is occupied by the shadow region and can be represented as:

$$r_o(R_j) \frac{|R_j|}{|bb(R_j)|}$$

Based on the extracted visual features, the image processing system 100 can train a decision tree, as mentioned above, to predict or otherwise identify whether each shadow region is part of a cast shadow. Specifically, the image processing system 100 can train the decision tree using manually labeled cast shadow regions in a set of training images, such as the set of training images 200 of FIG. 2. To illustrate, training the decision tree using the set of training images 200 of FIG. 2 achieves an average prediction error of 0.04 within the range of [0,1] on the testing dataset.

The decision tree calculates a probability that each shadow region in the segmented shadow map 606 is a cast shadow region. For example, the decision tree can determine the probability based on the visual features of the shadow regions. In one or more embodiments, the image processing system 100 can select the shadow region (e.g., $R_0$ in FIG. 6D) with the greatest calculated probability as the cast shadow region. The image processing system 100 can generate a cast shadow seed containing the predicted cast shadow region.

Because the cast shadow can cover multiple textures (e.g., objects or backgrounds) in the input image, the image processing system 100 can also determine that one or more shadow regions (e.g., $R_1$ in FIG. 6D) adjacent to the selected shadow region are part of the same cast shadow. Specifically, shadow regions that are adjacent to the selected shadow region and also have luminance gain values below a luminance threshold (e.g., adjacent shadow regions that are darker than the selected shadow region). For example, as shown in FIG. 6D, shadow region $R_0$ is the detected cast shadow region. $R_1$ is adjacent to $R_0$ and the averaged luminance gain value of $R_1$ is smaller than the averaged luminance gain value of $R_0$. Thus, the image processing system 100 treats $R_1$ as part of the cast shadow and adds $R_1$ to the cast shadow seed.

In one or more additional embodiments, the image processing system 100 can modify the cast shadow seed $R_{cast}$ to verify that the cast shadow region covers the cast shadow of the input image. In particular, the image processing system 100 can dilate the cast shadow seed until the average luminance gain $g_{avg}^L$ of the boundary pixels of the cast shadow seed is above a predetermined luminance threshold (e.g., 0.95). As shown in FIG. 6E, the image processing system 100 can generate a final cast shadow seed region $R_{seed}^L$ 608 as a binary map. In one or more additional embodiments, the image processing system 100 can compute the approximated luminance gain of the seed region, $g_{seed}^L$, as the average value of 20% pixels with the largest in $R_{seed}^L$. One or more implementations may also take into consideration that $R_{seed}^L$ can include a plurality of shadows with a top layer of shadows corresponding to pixels with highest luminance gains.

According to one or more additional embodiments, the image processing system 100 can soften the boundary of the cast shadow region (which may be denoted simply as $g_{seed}^L$) to account for errors, especially in regions with soft shadows in the input image. FIG. 6F illustrates a cast shadow map 610 corresponding to the cast shadow seed of FIG. 6E with softened boundaries. Specifically, the image processing system 100 can produce a luminance gain map, $g_c^L$, that more accurately captures the softness of shadows in the input image. For example, the image processing system 100 can apply an optimization algorithm such as a Markov Random Field (MRF) algorithm with an energy function defined as:

$$E(g_c^L) = \sum_p D(g_c^L(p)) + \lambda * \sum_{q \in N(p)} \mathcal{M}(g_c^L(p), g_c^L(q))$$

where p and q are pixel indices, and λ is a weight variable balancing data and smoothness terms. The data term $D(g_c^L(p))$ is defined as the weighted combination of two terms:

$$D(g_c^L(p)) = a_p |g_c^L(p) - g_{seed}^L| + (1-a_p)|g_c^L(p) - g_r^L(p)|$$

Based on the weighting factor a, the data term encourages $g_c^L$ to be close to either the average shadow value in the seed map, $g_{seed}^L$, or the initial luminance gain map, $g_r^L$. $a_i$ is computed as:

$$\alpha_p = \begin{cases} 1, & \text{if } g_{seed}^L(p_i) \geq g_r^L(p_i) \\ g(1 - g_{seed}^L(p_i)/g_r^L(p_i), \sigma_d), & \text{otherwise} \end{cases}$$

where $G(x,\sigma) = \exp(-x^2, \sigma^2)$ is a Gaussian function. If $g_{seed}^L$ is larger than $g_r^L$, signifying that a current pixel is likely covered by other shadows (such as $R_1$ in FIG. 6D), $g_c^L$ is constrained to be close to the cast shadow region $g_{seed}^L$. If $g_{seed}^L$ is much smaller than $g_r^L$, the pixel is likely located in a soft shadow boundary, and the second term of the MRF algorithm dominates the data term.

The smoothness term $M(g_c^L(p), g_c^L(q))$ is defined as:

$$M(g_c^L(p), g_c^L(q)) = |g_c^L(p) - g_r^L(p)| * A(p,q)$$

where the affinity weight A (p,q) is defined as:

$$A(p,q) = G(\|I(p) - I(q)\|_2, \sigma_m)$$

which encourages $g_c^L(p)$ and $g_c^L(q)$ to be the same if the two pixels have the same color in the input image.

Additionally, the image processing system 100 can obtain the final $g_c^L$ map can by solving the MRF algorithm using a-expansion, where $g_c^L$ is quantized into 128 levels. In one or more embodiments, the image processing system 100 can set $\lambda=10$, $\sigma_d=0.1$, $\sigma_m=0.2$. In other embodiments, the image processing system 100 may set $\lambda$, $\sigma_d$, $\sigma_m$ or to other values.

In one or more embodiments, the image processing system 100 can obtain the chrominance bias channels $b^A$, $b^B$ of the cast shadow map $S_c$ by scaling the initial estimates of the chrominance bias channels according to the luminance gain channel $g^L$:

$$b_c^A = b_c^{A*}(1 - g_c^L)/(1 - g_r^L)$$

$$b_c^B = b_c^{B*}(1 - g_c^L)/(1 - g_r^L)$$

The image processing system 100 can optimize for $g^L$ and using $g^L$ to scale $b_c^{(A,B)}$ to prevent the introduction of additional color shift. Additionally, by optimizing $g^L$, the image processing system 100 may produce more accurate results than by optimizing $b_c^{(A,B)}$, because $g^L$ may contain less noise than the chrominance channels. Alternatively, the image processing system 100 may optimize other values based on the selected color space and corresponding shadow parameters.

As mentioned previously, the image processing system 100 can use the cast shadow map 610 in a shadow removal process. Specifically, the shadow removal process may use the shadow parameters of the cast shadow map 610 to remove the cast shadow from the input image 600 by synthesizing the pixels in the cast shadow of the input image 600 based on the identified shadow parameters. In one or more embodiments, the image processing system 100 may use the cast shadow map 610 derived above to perform the shadow removal process described below. In one or more alternative embodiments, the image processing system 100 can use the cast shadow map 610 described herein to perform one or more shadow manipulation processes other than the shadow removal process described below.

In alternative embodiments, the image processing system 100 can perform additional or different operations to generate the cast shadow map 610 for the input image 600. For example, the image processing system 100 may optionally segment the all shadow map 602 into a segmented shadow map 606 without smoothing the all shadow map 602. Alternatively, the image processing system 100 can optionally perform additional smoothing or optimization operations on the all shadow map 602 before creating the segmented shadow map 606. Additionally, or alternatively, the image processing system 100 can use a different softening algorithm to create the cast shadow map 610 from the binary cast shadow seed 608.

Additionally, or alternatively, the image processing system 100 can use other processes to derive shadow parameters for the image patches of the input image. For example, the image processing system 100 may allow a user to manually label the cast shadow in the input image for removing from the input image. Alternatively, the image processing system 100 can use a different cast shadow detection method, including using other color spaces or shadow parameters than described herein, to obtain the cast shadow.

Patch-Based Synthesis for Shadow Removal

According to one or more embodiments, the image processing system 100 can generate a naïve (or "direct") inversion of an input image from a cast shadow map. In particular, the image processing system 100 can generate the naïve inversion by modifying each pixel independently based on the corresponding shadow parameters (e.g., by dividing the input image 600 by the final shadow map $g_c^L$ and associated the chrominance values):

$$I_n^L = I^L(p)/g_c^L(p)$$

$$I_n^a = I^a(p)/b_c^a(p)$$

$$I_n^b = I^b(p)/b_c^b(p)$$

where $I_n$ is the naïve inversion result, and superscripts L, a, b indicate the corresponding luminance and chrominance channels.

In one or more embodiments, the naïve inversion can remove most of the cast shadow based on a previously identified cast shadow map and preserve the structure of the input image 600. Estimation errors in the cast shadow map, however, can cause the naïve inversion to include at least some color shift and/or to be inconsistent relative to color, noise, and fine detail of existing non-shadowed regions of the input image. The inconsistencies can be due to inaccuracies in the estimation of the shadow parameters, but also inherent limitations of simple per-pixel color/intensity models that do not model the loss of dynamic range, differences in noise properties, complex bidirectional reflectance distribution, inter-reflections, translucency, and other complex material properties that may be different between the shadowed versus non-shadowed regions.

In one or more embodiments, the image processing system 100 can leverage information about the textures in the input image. Specifically, textures in the shadowed regions of the input image also exist in the non-shadowed regions. Thus, the image processing system 100 can guide a patch synthesis algorithm using the naïve inversion of the input image to reconstruct the shadowed region from the non-shadowed parts and produce a result that is more consistent with the rest of the input image than the naïve inversion alone. For example, the image processing system 100 can also apply a local color correction step that adaptively combines an initial patch synthesis result with the naïve inversion to produce a final result, as described in more detail below with regard to FIGS. 7A-7F.

As mentioned, the image processing system 100 can use patch-based synthesis to recover image patches in the cast shadow region using image patches from the non-shadow regions of the input image. In one or more embodiments, the image processing system 100 can avoid color inconsistencies in the synthesized result because the image patches in the synthesized shadow regions are drawn from the non-shadow regions. To illustrate, the image processing system 100 can use a guided synthesis algorithm, such as a guided variant of the image melding algorithm described in "Image Melding: Combining inconsistent images using patch-based synthesis," ACM Trans. Graph. 31, 4, 82:1-82:10 by Darabi et al. hereby incorporated by reference in its entirety. The image-melding algorithm can provide support for patch scaling, rotation, reflection, and color gain and bias in various image-processing operations. Additionally, the image processing system 100 can apply the image-melding algorithm in a coarse-to-fine manner using an image pyramid.

FIGS. 7A-7F illustrate embodiments of an input image 700 and images derived from the input image 700 in association with a patch-based synthesis process. Specifically, FIG. 7A illustrates an input image 700 for which the image processing system 100 has identified a cast shadow map. FIG. 7B illustrates a naïve inversion 702 of the input image 700 of FIG. 7A. As shown, although the naïve inversion may include color shifting artifacts, the naïve inversion 702 can provide a good rough estimate of the final result that the image processing system 100 can leverage for guiding the synthesis process. Specifically, the image processing system 100 can use the naïve inversion 702 in two ways: (1) to initialize the synthesis result at the coarsest level; and (2) to use as a guidance layer during the synthesis of the shadowed region. Specifically, the distance between P (a shadowed image patch to be synthesized) and Q (a source image patch in the non-shadowed region) can be defined as:

$$d(P,Q) = \|P,Q\|_2 + \beta^* \|I_n(P), Q^*g(P) + b(P)\|_2 + \gamma^* E(g(P), b(P))$$

where $\|P, Q\|_2$ is the average L2 color distance of two patches, $I_n$ (P) represents the image patch in the naïve inversion $I_n$ 702 that is at the same position as P, and β and γ are balancing weights. The second term $\beta^* \|I_n (P), Q^*g (P)+b (P)\|_2$ is a guidance term that constrains the matched source patch Q to be similar to the naïve inversion result $I_n$(P). The additional gain g (P) and bias b (P) are independent of the gain/bias terms used in the computation of the shadow map and are used in the above equation to compensate for possible color and intensity shifts in the naïve inversion 702. The third term $E(g(P_i), b(P_i))$ prevents unrealistically large gain and bias, defined as:

$$E(g, b) = \sum_k (|g^k - 1| + |b^k - 0|) k \in \{L, a, b\}$$

In one or more embodiments, the balancing weight β can be an important factor in providing an accurate final synthesis result. If β is too small, the guidance term may be too weak, and geometric constraints may be broken in the final synthesis result. FIG. 7C illustrates a reconstructed image 704 with a β=0.3. If β is too large, the algorithm may not converge for examples where the textures are random in the shadow region and are not easily reconstructed from the non-shadow regions. FIG. 7D illustrates a reconstructed image 706 with a β=30.

Although a single, fixed β can generate good results in many cases, the guidance aspect of the synthesis result may have a greater effect at coarse scales for generating a consistent geometric layout of different scene regions, while more flexibility at fine scales can synthesize high quality texture details with a local patch similarity term. Thus, the image processing system 100 can use a large β to bias the synthesis algorithm more towards geometric consistency, and a smaller β at finer scales to weaken the constraint of the guidance layer. FIG. 7E illustrates a final synthesis result 708 using the adaptive β in a synthesis process guided by the naïve inversion.

In contrast, FIG. 7F illustrates a synthesis result 710 as guided by the input image, rather than the naïve inversion. As shown, the final synthesis result (shown in FIG. 7E) that is guided by the naïve inversion produces a more accurate reconstruction of the original image without the cast shadows than the synthesis result (shown in FIG. 7F) that is guided by the input image. Thus, a guidance layer resulting from a good shadow map estimate and the naïve inversion of the input image can allow the image processing system 100 to achieve a high quality final synthesis result.

In one or more embodiments, the image processing system 100 can also set parameters to specific values based on the desired result and/or according to various implementations of the shadow removal process. In one specific example, the image processing system 100 can decompose the input image into a pyramid with a coarsest scale of 30 pixels and increase the scale by a factor of 1.4 for each pyramid level. Additionally, the image processing system 100 can set β to 30 in the first five levels of the pyramid and gradually decrease β to 0.3 in the remaining levels. The image processing system 100 can also compute patch distance for image patch pairs in the CIELab color space with a gain range [0.9, 1.1] and bias range [−0.05, 0.05]. The image processing system 100 can also fix γ at 0.5.

Adaptive Local Correction

Figure 8C:
FIGS. 8A-8O illustrate embodiments of input images and modified images derived from a patch-based synthesis process in accordance with one or more embodiments.
Figure 8F:
Figure 8B:

In one or more embodiments, the image processing system 100 can use the patch synthesis results described with regard to FIGS. 7A-7F as the final synthesis result. As previously mentioned, however, the synthesis result can include artifacts associated with complex scenes, especially when certain textures exist only in the shadowed region of the input image and no good correspondences exist in the non-shadowed region. Such problems can result in blurriness, changes in color/texture, or inaccurate geometry of structures in the synthesis result. FIGS. 8A-8E illustrate embodiments of an input image 800 and a plurality of images derived from the input image using 800 a patch-based synthesis (e.g., shadow removal) process. Specifically, FIG. 8A illustrates an input image 800 that includes a portion of the input image 600 of FIG. 6A. For example, FIG. 8B illustrates the initial synthesized result 802 for the input image 800 of FIG. 8A having incorrect color and/or boundary synthesis.

According to one or more embodiments, the image processing system 100 can find a luminance gain value and chrominance bias values that capture the transformation from the input image to the initial synthesized result in a synthesized shadow map. Optionally, the image processing system 100 can apply local corrections to the synthesized shadow map in regions where the initial synthesized result has low confidence to correct the synthesis artifacts. Specifically, the image processing system 100 can calculate a synthesis confidence $C(p)$ for each pixel based on the naïve inversion $I_n$ and the initial synthesis result $I_s$ (shown in FIG. 8B):

$$C(p) = 1 - \frac{\min_{g,b} \|I_n(P), I_s(P) * g(p) + (b)(p)\|_2}{\|I_n(P)\|_2 + \varepsilon}$$

where P is a 5×5 image patch centered at p. FIG. 8C illustrates the naïve inversion 804 of the portion of the input image. Searching the best gain for the L channel and the best bias for the a and b channels per patch can minimize the distance between $I_n$ (P) and $I_s(P)$. The image processing system 100 can also normalize the confidence by the average pixel luminance $\|I_n(P)\|_2$ to avoid a bias in dark regions, and £ is a variable that handles division by zero. FIG. 8D illustrates an example confidence map 806 (also referred to herein as the confidence map C) based on the input image 800, and the initial synthesis result 802, and the naïve inversion 804. If $I_n(P_i)$ and $I_s(P_i)$ contain the same structure and only differ by global color transform, the confidence for the particular patch can be high. Otherwise, if $I_n(P_i)$ and $I_s(P_i)$ contain structural differences, the confidence value can be low, indicating incorrect patch synthesis.

In one or more embodiments, the image processing system 100 can propagate shadow parameters in the synthesized shadow map $S_s$ from high confidence pixels to low confidence pixels based on the confidence map. In particular, the image processing system 100 can optimize a quadratic objective function for the $k^{th}$ channel of the synthesized shadow map, denoted as $S_s^k$, to produce an interpolated map $S^k$ by minimizing:

$$E^k = \sum_p C(p) * (S^k(p) - S_s^k(p))^2 + \lambda_s * \sum_{q \in N(p)} (1 - C(p)) * \mathcal{A}(p, q) * (S^k(p) - S^k(q))^2$$

The first term in the above equation is a data term that constrains $S^k$ to be close to $S_s^k$ at high confidence pixels. The second term is a smoothness term that is weighted by the color difference of neighboring pixels, along with 1−C. Thus, low confidence pixels can receive parameter values from neighboring pixels that have similar colors to the low confidence pixels. Additionally, in one example, the image processing system 100 can set $\lambda_s=1$ and solve the linear system using a conjugate gradient.

Figure 8E:
Figure 8A:
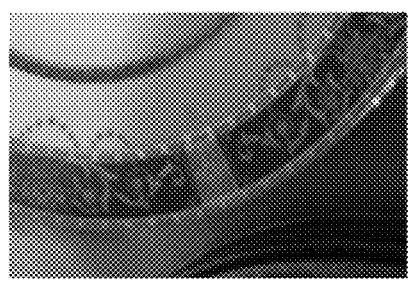
Figure 8D:

In one or more embodiments, the image processing system 100 can obtain the final synthesis result 808, illustrated in FIG. 8E, by applying the corrected shadow map on the original input image. Specifically, for high confidence pixels where texture synthesis is determined to be good (e.g., meeting a confidence threshold), the image processing system 100 uses the synthesized image $I_s$ to re-estimate the shadow parameters and substitute the re-estimated shadow parameters in the naïve inversion $I_n$. Thus, the image processing system 100 performs an operation similar to overwriting the naïve inversion $I_n$ at one or more pixels with the corresponding pixels from the initial synthesized result $I_s$.

For low confidence pixels where texture synthesis fails, the image processing system 100 can defer to the naïve inversion $I_n$. In particular, the image processing system 100 can use the pixels from the naïve inversion $I_n$ and apply a color shift to the corresponding pixels in $I_n$. For example, the image processing system 100 can remove the color shifts in $I_n$ by interpolating parameters from nearby high confidence pixels from $I_n$. Thus, the image processing system 100 can create a final synthesis result 808 that is a fusion of the initial synthesis result $I_s$ and the naïve inversion $I_n$ of the input image.

In one or more alternative embodiments, the image processing system 100 can generate an alpha blending 810 of the initial synthesized image 802 and the naïve inversion 804, as shown in FIG. 8F. Specifically, the image processing system 100 can use the confidence map 806 as an alpha matte to linearly interpolate the initial synthesis result 802 and the naïve inversion 804 of the input image 800 to obtain the alpha blending 810. The alpha blending 810, however, may preserve color shift artifacts from the naïve inversion 804 while synthesizing the image patches of the input image 800.

In one or more embodiments, the image processing system 100 can implement the shadow detection and removal operations described previously in C++. In one implementation, the image processing system 100 used to produce the figures described herein includes a computing device with a 3.4 GHz processor and 2 GB of RAM. The image processing system 100 down-samples the figures to 600×450 pixels. For a single-threaded processing implementation, the image processing system 100 takes about 1.8 minutes for all shadow map generation, 9 seconds for cast shadow detection, and 2 minutes for shadow removal.

As discussed above, image processing system 100 can identify and remove shadows from images, including complex images that contain shadowed regions with large texture variations. In addition to the foregoing, the image processing system 100 can allow for filtering, transforming, and reapplication of shadows to edited results. Thus, the image processing system 100 can allow a user to suppress (rather than totally remove) shadows, enhance shadows, soften shadows, and reshape shadows. For example, FIGS. 8G-8L illustrate various shadow editing or removal results of an input image 811. In particular, FIG. 8H shows a modified image 812 created by the image processing system 100 by recognizing then suppressing the shadow of the input image 811. FIG. 8I shows a modified image 814 created by the image processing system 100 by recognizing then enhancing the shadow of the input image 811. FIG. 8J shows a modified image 816 created by the image processing system 100 by recognizing then softening the shadow of the input image 811. FIG. 8K shows a modified image 818 created by the image processing system 100 by recognizing then reshaping the shadow of the input image 811. Finally, FIG. 8L shows a modified image 819 created by the image processing system 100 by recognizing then removing the shadow of the input image 811. As FIGS. 8G-8L illustrate, the image processing system 100 can provide a user with great flexibility to recognize and modify shadows.

Figure 8O:
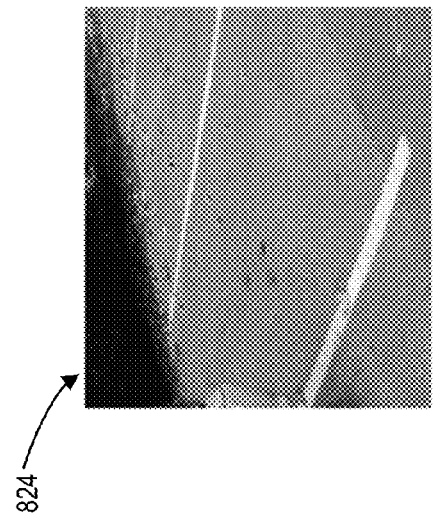
Figure 8N:
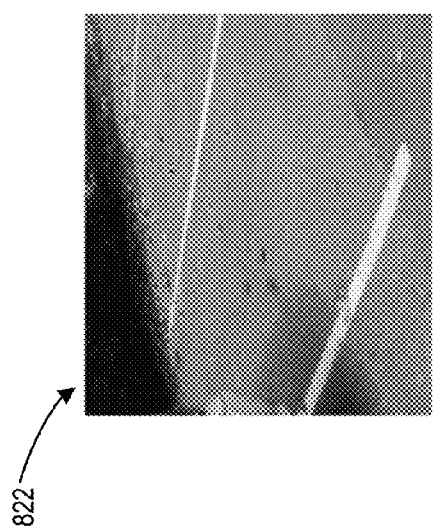
Figure 8M:
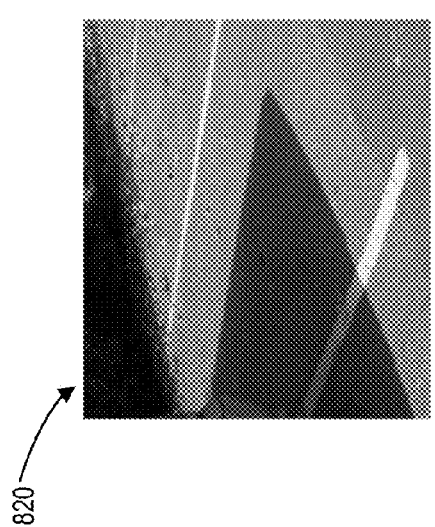

Furthermore, the methods described above in relation to identifying and removing cast shadows can be iteratively repeated to remove multiple shadows or even one or more layers of overlapping shadows. In particular, the cast shadow detection described above can isolate and remove only a top layer cast shadow or multiple layers of cast shadows. The ability to extract and remove different shadows layers can allow the image processing system 100 to edit or otherwise manipulate different shadow layers in different ways. For example, FIG. 8M illustrates an input image 820 with layered shadows. In particular, input image 820 includes an inner shadow created by a car and an outer shadow created by a building. The image processing system 100, as described above, includes the ability to recognize different layers of shadows. For example, FIG. 8N a modified image 822 created by the image processing system 100 by recognizing then removing the outer shadow of the input image 820. As shown, the modified image 822 retains the inner shadow created by the car. FIG. 8O on the other hand shows a modified image 824 created by the image processing system 100 by recognizing then removing the inner shadow of the modified image 822.

FIGS. 1-8O, the corresponding text, and the examples, provide a number of different systems and devices for tracking visual gaze information and providing content and analytics based on the visual gaze information. In addition to the foregoing, embodiments can be described in terms of flowcharts comprising acts and steps in a method for accomplishing a particular result. For example, FIGS. 9 and 10 illustrate flowcharts of exemplary methods in accordance with one or more embodiments.

Figure 9:
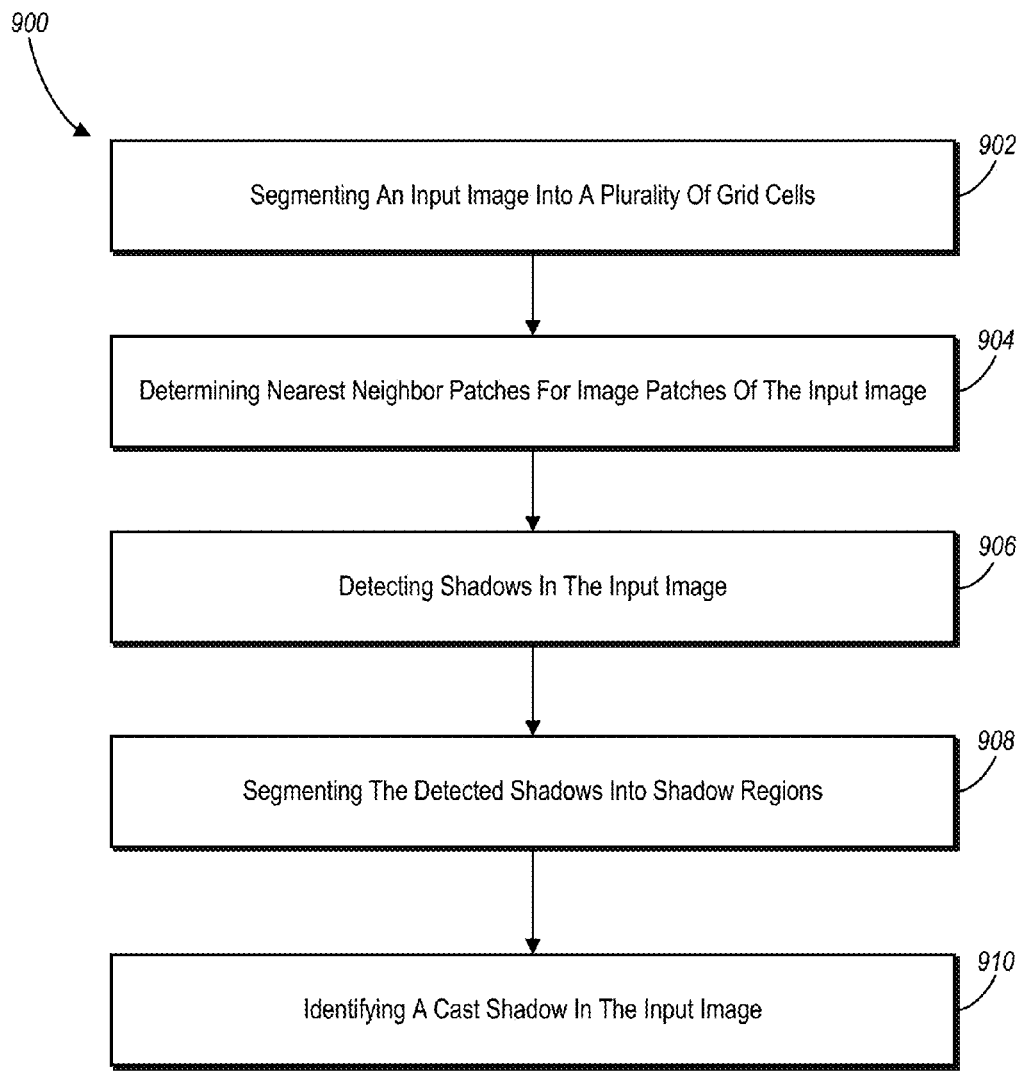
FIG. 9 illustrates a flowchart of a series of acts in a method of identifying cast shadows in an image in accordance with one or more embodiments.
Figure 10:
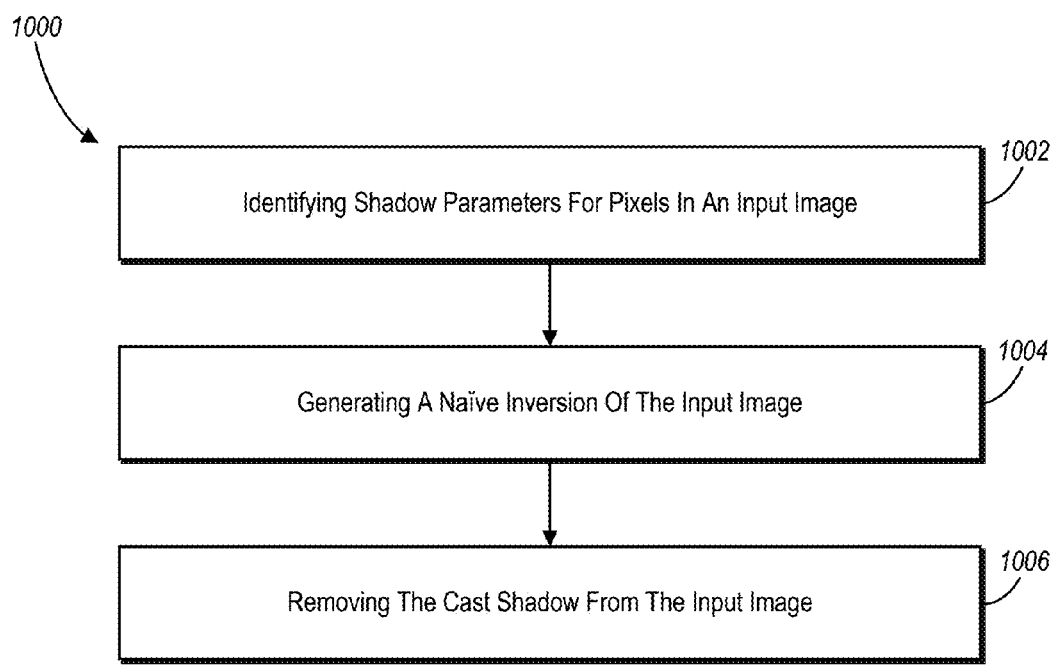
FIG. 10 illustrates a flowchart of a series of acts in a method of removing cast shadows from an image in accordance with one or more embodiments.

FIG. 9 illustrates a flowchart of a method 900 of identifying cast shadows in an image. The method 900 includes an act 902 of segmenting an input image 300, 600 into a plurality of grid cells 306. For example, act 902 can involve segmenting the input image 300, 600 into a plurality of grid cells 306 of equal size. Alternatively, act 902 can involve segmenting the input image 300, 600 into a plurality of grid cells 306 of different sizes based on size dimensions of the input image 300, 600. Act 902 can also involve down-sampling the input image 300, 600 to a smaller resolution prior to segmenting the input image 300, 600 into the plurality of grid cells 306.

Act 902 can further involve segmenting the input image 300, 600 into a plurality of grid cells 306 in response to an identification of the input image 300, 600 by a user. Act 902 can alternatively involve segmenting a portion of the input image 300, 600 into a plurality of grid cells 306 in response to a selection of the portion of the input image 300, 600 by a user.

The method 900 also includes an act 904 of determining nearest neighbor patches for image patches of the input image. For example, act 904 involves determining, for image patches 302 of the input image 300, 600 one or more nearest neighbor patches 304 from grid cells of the plurality of grid cells 306 by identifying, for a given image patch, one or more corresponding image patches that have one or more visual features in common with the given image patch. To illustrate, act 904 can involve determining the one or more nearest neighbor patches 304 from the grid cells 306 using a patch matching algorithm applied to the grid cells 306. The method 900 can also include an act of calculating a predetermined range for identifying whether the one or more corresponding image patches have one or more visual features in common with given image patches by setting a matching precision and a matching recall of the patch matching algorithm based on a parameter threshold corresponding to coverage of shadow pixels in a training dataset.

Additionally, the method 900 includes an act 906 of detecting shadows in the input image. For example, act 906 involves detecting shadows in the input image 300, 600 based on extracted feature vectors of the image patches 302 and their one or more nearest neighbor patches 304. To illustrate, act 906 can involve applying a regression algorithm to combined feature vectors of the plurality of image patches in the input image 300, 600 to detect the shadows in the input image 300, 600.

Act 906 can also involve generating feature vectors for the image patches 302 and their one or more nearest neighbor patches 304 by identifying the one or more visual features, a matching cost, or spatial offset information of the one or more nearest neighbor patches 304 relative to their corresponding image patches 302. Specifically, the one or more visual features can comprise at least one of a luminance gain value or a chrominance bias value within a CIELab color space.

As part of act 906, or as an additional act, the method 900 can include an act of calculating, for the image patches 302, a feature vector for each matching pair comprising the image patch 302 and a corresponding nearest neighbor patch 304. The method 900 can further include an act of ranking the feature vectors of the image patches 302 and their one or more nearest neighbor patches based on a luminance gain value of the feature vectors, and concatenating the ranked feature vectors for an image patch into a combined feature vector for the image patch.

As part of act 906, or as an additional act, the method 900 can include an act of removing noise associated with the detected shadows prior to identifying the cast shadow by applying a smoothing algorithm to the detected shadows. For example, the method 900 can remove noise by applying a smoothing algorithm to a luminance gain map 602 derived from the image patches and their one or more corresponding nearest neighbor patches.

The method 900 can also include an act 908 of segmenting the detected shadows into shadow regions $R_0$, $R_1$. For example, act 908 involves segmenting the detected shadows into one or more shadow regions $R_0$, $R_1$ based on luminance variations of the detected shadows. To illustrate, act 908 can involve applying a clustering algorithm to the detected shadows to form a plurality of clusters. Act 908 can further involve assigning each pixel of the detected shadows to a cluster center of one of the plurality of clusters. To illustrate, act 908 can involve designating adjacent pixels that are assigned to the same cluster center as a shadow region $R_0$, $R_1$.

The method 900 further includes an act 910 of identifying cast shadows in the input image 300, 600. For example, act 910 involves identifying cast shadows in the input image 300, 600 based on the one or more shadow regions $R_0$, $R_1$. To illustrate, act 910 can involve calculating a probability that each of the one or more shadow regions $R_0$, $R_1$ is the cast shadow by applying a decision tree to one or more visual features of the one or more shadow regions $R_0$, $R_1$, and selecting a shadow region $R_0$ with a highest calculated probability from the decision tree as the cast shadow. Additionally, act 908 can involve selecting shadow regions that are adjacent to the selected shadow region $R_0$ with the highest calculated probability and have a luminance gain value smaller than the selected shadow region $R_0$ with the highest calculated probability as the cast shadow.

The method 900 also includes an act of generating a cast shadow map 610. For example, generating the cast shadow map 610 can involve generating a cast shadow map 610 comprising the identified cast shadows in the input image 300, 600. To illustrate, the method 900 can include an act of combining a selected shadow region $R_0$ and adjacent shadow regions $R_1$ having a luminance gain value smaller than the selected shadow region $R_0$ as the cast shadow, and generating the cast shadow map 610 based on luminance gain values of the selected shadow region $R_0$ and the adjacent shadow regions $R_1$ having a luminance gain value smaller than the selected shadow region $R_0$.

The method 900 can also include an act of dilating the cast shadow until an average luminance gain value of pixels at a boundary of the cast shadow meets a predetermined luminance threshold, and softening the boundary of the cast shadow by applying a softening algorithm to the pixels at the boundary of the cast shadow. For example, the method 900 can include the act of softening the boundary of the cast shadow by applying a Markov Random Field algorithm to the cast shadow map 610.

The method 900 can also include an act of receiving a user input to modify the cast shadow, and modifying one or more of the shadow parameters associated with a plurality of pixels in the cast shadow based on the user input. To illustrate, the method 900 can include an act of removing the cast shadow from the input image 300, 600.

The method 900 can further include an act of identifying multiple cast shadows by iteratively repeating the steps of: determining, for images patches 302 of the input image 300, 600, one or more nearest neighbor patches 304 from grid cells of the plurality of grid cells 306, detecting shadows in the input image based on feature vectors of the image patches 302 and their one or more nearest neighbor patches 304, segmenting the detected shadows into one or more shadow regions $R_0$, $R_1$ based on luminance variations of the detected shadows, and identifying a cast shadow in the input image 300, 600 based on the one or more shadow regions $R_0$, $R_1$.

The method 900 can additionally include an act of identifying a first cast shadow from a first object and a second cast shadow from a second object, the first cast shadow overlapping the second cast shadow. The method 900 can also include an act of removing the first cast shadow from the input image 300, 600 and leaving the second cast shadow in the input image 300, 600. Alternatively, the method 900 can include an act of removing the first cast shadow from the input image and iteratively removing the second cast shadow from the input image 300, 600 after removing the first cast shadow from the input image 300, 600. Alternatively, the method 900 can include an act of applying a first type of modification to the first cast shadow and a second type of modification to the second cast shadow.

FIG. 10 illustrates a flowchart of a method 1000 of removing cast shadows from an input image 700, 800. The method 1000 includes an act 1002 of identifying shadow parameters of a cast shadow. For example, act 1002 includes identifying one or more shadow parameters for pixels corresponding to a cast shadow of an input image 700, 800. Specifically, the one or more shadow parameters can identify differences between one or more color space parameters of pixels corresponding to the cast shadow and one or more color space parameters of a non-shadowed version of the pixels.

Furthermore, act 1002 can involve identifying one or more shadow parameters based on a cast shadow map 610 automatically generated in response to a user selection of the input image 700, 800. Alternatively, act 1002 can involve identifying one or more shadow parameters based on a manual user selection of one or more shadow regions $R_0$, $R_1$ within the input image 700, 800.

The method 1000 further includes an act 1004 of generating a naïve inversion of the input image. For example, act 1004 involves generating a naïve inversion 702, 804 of the input image 700, 800 by reducing, for each pixel corresponding to the cast shadow, one or more color space parameters of the pixel based on the one or more shadow parameters to set the one or more color space parameters at a corresponding parameter threshold. To illustrate, act 1004 can involve generating the naïve inversion of the input image 700, 800 by modifying a luminance gain value and one or more chrominance bias values of pixels corresponding to the cast shadow according to the one or more shadow parameters.

The method 1000 also includes an act 1006 of removing the cast shadow from the input image 700, 800. For example, act 1006 involves removing the cast shadow from the input image 700, 800 by synthesizing a plurality of image patches corresponding to the cast shadow based on a plurality of non-shadow image patches from the input image 700, 800 and a plurality of image patches from the naïve inversion 702, 804 of the input image 700, 800. To illustrate, act 1006 can involve constraining a source image patch from a non-shadowed region of the input image used to synthesize a shadowed image patch 302 of the input image 700, 800 to have one or more color space parameters within a predetermined threshold of one or more color space parameters of a corresponding image patch in the naïve inversion 702, 804.

Additionally, or alternatively, act 1006 can involve applying an adaptive balancing variable to a guidance term of a synthesis algorithm, wherein a value of the adaptive balancing variable is based on a granularity of the synthesis algorithm. To illustrate, act 1006 can involve setting the adaptive balancing variable above a threshold at coarse granularity above a granularity threshold. Alternatively, act 1006 can involve setting the adaptive balancing variable below the threshold at fine granularity below the granularity threshold.

As part of act 1006, or as an additional act, the method 1000 can include an act of calculating a synthesis confidence value for the pixels in the synthesized plurality of image patches to generate a confidence map 806. The method 1000 can further include an act of synthesizing one or more pixels having a synthesis confidence value that meets a confidence threshold using the one or more shadow parameters from a plurality of other pixels in the synthesized plurality of image patches having a color difference relative to the one or more pixels within a color threshold.

Additionally, the method 1000 can include an act of synthesizing one or more pixels having a synthesis confidence value that does not meet the confidence threshold by removing a color shift from one or more corresponding pixels in the naïve inversion 702, 804 of the input image 700, 800 based on the one or more shadow parameters from a plurality of other pixels in the naïve inversion 702, 804 having a synthesis confidence value that meets the confidence threshold. The method 1000 can also include an act of normalizing the synthesis confidence value for the pixels based on an average pixel luminance of a corresponding image patch in the naïve inversion 702, 804.

The method 1000 can further include an act of identifying a plurality of patch correspondences between shadowed image patches and non-shadowed image patches in the input image 700, 800. The method 1000 can also include an act of detecting one or more shadows in the input image based on one or more visual features of the patch correspondences. The method 1000 can also include an act of segmenting the detected shadows in the input image 700, 800 into one or more shadow regions based on luminance variations of the detected shadows, and identifying the cast shadow from the one or more shadow regions $R_0$, $R_1$.

In another embodiment, a method of identifying and removing cast shadows from an image includes an act of determining, for each image patch from a plurality of image patches in an input image and using a grid-based patch-matching algorithm, a plurality of nearest neighbor patches comprising one or more visual features having a value within a predetermined range of the corresponding image patch. The method includes an act of detecting shadows in the input image based on extracted feature vectors of each image patch and the corresponding nearest neighbor patches. The method further includes an act of identifying one or more cast shadows from the detected shadows using a decision tree trained using manually labeled cast shadow regions in a training dataset. Additionally, the method includes an act of comparing one or more color space parameters of each pixel in the one or more identified cast shadows to a corresponding parameter threshold. The method also includes an act of generating a naïve inversion of the input image by modifying each pixel in the one or more identified cast shadows to meet the corresponding parameter threshold. The method also includes an act of removing the one or more identified cast shadows by synthesizing a plurality of image patches corresponding to the one or more predicted cast shadows based on a plurality of non-shadow image patches from the input image and the naïve inversion of the input image.

The method can also include an act of generating one or more shadow regions from the detected shadows using a clustering algorithm on the detected shadows, and identifying the one or more cast shadows from the one or more shadow regions based on a calculated probability that each of the one or more shadow regions belongs to a cast shadow.

Additionally, or alternatively, the method can include an act of calculate a synthesis confidence value for each pixel in the synthesized plurality of image patches to generate a confidence map. The method can include acts of synthesizing one or more pixels having a synthesis confidence value that meets a confidence threshold using the one or more shadow parameters from a plurality of other pixels in the synthesized plurality of image patches having a color difference relative to the one or more pixels within a color threshold, and synthesizing one or more pixels having a synthesis confidence value that does not meet the confidence threshold by removing a color shift from one or more corresponding pixels in the naïve inversion of the input image based on the one or more shadow parameters from a plurality of other pixels in the naïve inversion having a synthesis confidence value that meets the confidence threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
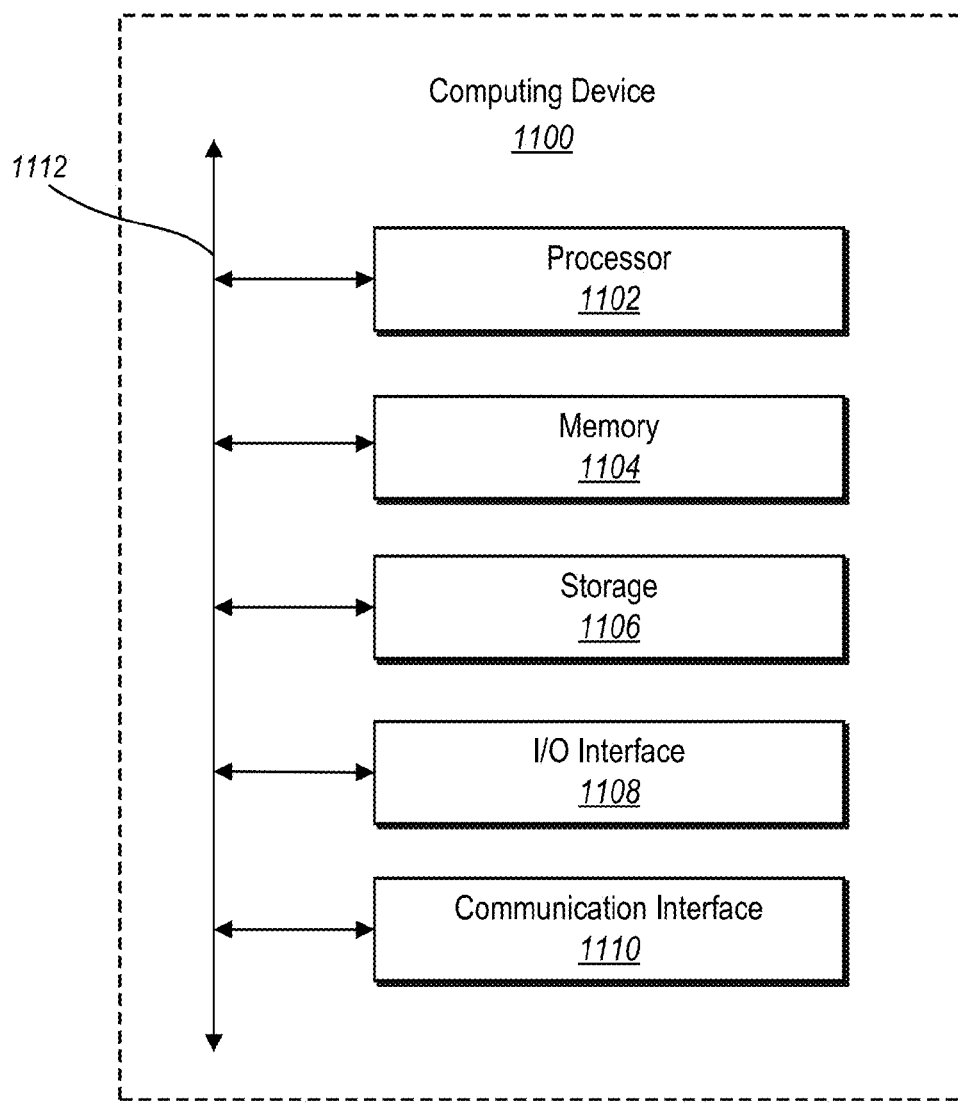
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the image processing system 100. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 7, the components illustrated in FIG. 7 are not intended to be limiting. Additional or alternative components may be used in other embodiments. Furthermore, in certain embodiments, the computing device 1100 can include fewer components than those shown in FIG. 7. Components of the computing device 1100 shown in FIG. 7 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of identifying cast shadows in a digital image, the method comprising:
   segmenting, by at least one processor, the digital image into a plurality of grid cells;
   determining, for image patches of the digital image, one or more nearest neighbor patches from the plurality of grid cells by identifying, for a given image patch, one or more corresponding image patches that have one or more visual features in common with the given image patch;
   detecting, by the at least one processor, shadows in the digital image based on feature vectors of the image patches and their one or more nearest neighbor patches;
   segmenting, by the at least one processor, the detected shadows into one or more shadow regions based on luminance variations of the detected shadows; and identifying, by the at least one processor, a cast shadow in the digital image based on the one or more shadow regions.

2. The method as recited in claim 1, further comprising generating the feature vectors for the image patches and their one or more nearest neighbor patches by identifying the one or more visual features, a matching cost, or spatial offset information of the one or more nearest neighbor patches relative to their corresponding image patches.

3. The method as recited in claim 2, wherein the one or more visual features comprise at least one of a luminance gain value or a chrominance bias value within a CIELab color space.

4. The method as recited in claim 2, further comprising:
determining the one or more nearest neighbor patches from each grid cell of the plurality of grid cells using a patch matching algorithm applied to the plurality of grid cells; and
calculating a predetermined range for identifying whether the one or more corresponding image patches have one or more visual features in common with given image patches by setting a matching precision and a matching recall of the patch matching algorithm based on a parameter threshold corresponding to coverage of shadow pixels in a training dataset.

5. The method as recited in claim 2, further comprising:
ranking the feature vectors of the image patches and their one or more nearest neighbor patches based on a luminance gain value of the feature vectors; and
concatenating the ranked feature vectors for an image patch into a combined feature vector for the image patch.

6. The method as recited in claim 5, wherein detecting the shadows in the digital image based on feature vectors of the image patches and the their one or more nearest neighbor patches comprises applying a regression algorithm to the combined feature vectors of the plurality of image patches in the digital image to detect the shadows in the digital image.

7. The method as recited in claim 1, further comprising removing noise associated with the detected shadows prior to identifying the cast shadow by applying a smoothing algorithm to the detected shadows.

8. The method as recited in claim 1, wherein segmenting the detected shadows into one or more shadow regions further comprises:
applying a clustering algorithm to the detected shadows to form a plurality of clusters;
assigning each pixel of the detected shadows to a cluster center of one of the plurality of clusters; and
designating adjacent pixels that are assigned to the same cluster center as a shadow region.

9. The method as recited in claim 1, wherein identifying the cast shadow in the digital image based on the one or more shadow regions comprises:
calculating a probability that each of the one or more shadow regions is the cast shadow by applying a decision tree to one or more visual features of the one or more shadow regions; and
selecting a shadow region with a highest calculated probability from the decision tree as the cast shadow.

10. The method as recited in claim 9, further comprising selecting shadow regions that are adjacent to the selected shadow region with the highest calculated probability and have a luminance gain value smaller than the selected shadow region with the highest calculated probability as the cast shadow.

11. The method as recited in claim 10, further comprising:
dilating the cast shadow until an average luminance gain value of pixels at a boundary of the cast shadow meets a predetermined luminance threshold; and
softening the boundary of the cast shadow by applying a softening algorithm to the pixels at the boundary of the cast shadow.

12. The method of claim 1, further comprising identifying multiple cast shadows by iteratively repeating the steps of:
determining, for images patches of the digital image, one or more nearest neighbor patches from the plurality of grid cells;
detecting shadows in the digital image based on feature vectors of the image patches and their one or more nearest neighbor patches;
segmenting the detected shadows into one or more shadow regions based on luminance variations of the detected shadows; and
identifying a cast shadow in the digital image based on the one or more shadow regions.

13. A method of removing cast shadows from a digital image, the method comprising:
identifying, by at least one processor, one or more shadow parameters for pixels in a digital image corresponding to a cast shadow;
generating, by the at least one processor, a naïve inversion of the digital image by reducing, for each pixel corresponding to the cast shadow, one or more color space parameters of the pixel based on the one or more shadow parameters to set the one or more color space parameters at a corresponding parameter threshold; and
removing the cast shadow from the digital image by synthesizing, by the at least one processor, a plurality of image patches corresponding to the cast shadow based on a plurality of non-shadow image patches from the digital image and a plurality of image patches from the naïve inversion of the digital image.

14. The method as recited in claim 13, further comprising:
calculating a synthesis confidence value for the pixels in the synthesized plurality of image patches to generate a confidence map; and
synthesizing one or more pixels having a synthesis confidence value that meets a confidence threshold using the one or more shadow parameters from a plurality of other pixels in the synthesized plurality of image patches having a color difference relative to the one or more pixels within a color threshold.

15. The method as recited in claim 14, further comprising synthesizing one or more pixels having a synthesis confidence value that does not meet the confidence threshold by removing a color shift from one or more corresponding pixels in the naïve inversion of the digital image based on the one or more shadow parameters from a plurality of other pixels in the naïve inversion having a synthesis confidence value that meets the confidence threshold.

16. The method as recited in claim 14, further comprising normalizing the synthesis confidence value for the pixels based on an average pixel luminance of a corresponding image patch in the naïve inversion.

17. The method as recited in claim 13, further comprising:
identifying a plurality of patch correspondences between shadowed image patches and non-shadowed image patches in the digital image;
detecting one or more shadows in the digital image based on one or more visual features of the patch correspondences;

segmenting the detected shadows in the digital image into one or more shadow regions based on luminance variations of the detected shadows; and identifying the cast shadow from the one or more shadow regions.

18. A system for identifying and removing cast shadows from a digital image, comprising:

at least one processor;

at least one non-transitory computer readable storage medium storing instructions thereon, that, when executed by the at least one processor, cause the system to:

determine, for each image patch from a plurality of image patches in a digital image and using a grid-based patch-matching algorithm, a plurality of nearest neighbor patches comprising one or more visual features having a value within a predetermined range of the corresponding image patch;

detect shadows in the digital image based on extracted feature vectors of each image patch and the corresponding nearest neighbor patches;

identify one or more cast shadows from the detected shadows using a decision tree trained using manually labeled cast shadow regions in a training dataset;

compare one or more color space parameters of each pixel in the one or more identified cast shadows to a corresponding parameter threshold;

generate a naïve inversion of the digital image by modifying each pixel in the one or more identified cast shadows to meet the corresponding parameter threshold; and remove the one or more identified cast shadows by synthesizing a plurality of image patches corresponding to the one or more predicted cast shadows based on a plurality of non-shadow image patches from the digital image and the naïve inversion of the digital image.

19. The system as recited in claim 18, further comprising instructions that, when executed by the at least one processor, cause the system to:

generate one or more shadow regions from the detected shadows using a clustering algorithm on the detected shadows;

identify the one or more cast shadows from the one or more shadow regions based on a calculated probability that each of the one or more shadow regions belongs to a cast shadow.

20. The system as recited in claim 18, further comprising instructions that, when executed by the at least one processor, cause the system to:

calculate a synthesis confidence value for each pixel in the synthesized plurality of image patches to generate a confidence map;

synthesize one or more pixels having a synthesis confidence value that meets a confidence threshold using the one or more shadow parameters from a plurality of other pixels in the synthesized plurality of image patches having a color difference relative to the one or more pixels within a color threshold; and synthesize one or more pixels having a synthesis confidence value that does not meet the confidence threshold by removing a color shift from one or more corresponding pixels in the naïve inversion of the digital image based on the one or more shadow parameters from a plurality of other pixels in the naïve inversion having a synthesis confidence value that meets the confidence threshold.

* * * * *